United States Patent
Jung et al.

(10) Patent No.: US 11,917,683 B2
(45) Date of Patent: Feb. 27, 2024

(54) METHOD AND APPARATUS FOR TRANSMITTING/RECEIVING SIGNAL BY USING VARIABLE BAND WIDTH IN COMMUNICATION SYSTEM

(71) Applicant: ELECTRONICS AND TELECOMMUNICATIONS RESEARCH INSTITUTE, Daejeon (KR)

(72) Inventors: Hoi Yoon Jung, Daejeon (KR); Sung Ik Park, Daejeon (KR); Heung Mook Kim, Daejeon (KR); Nam Ho Hur, Sejong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 302 days.

(21) Appl. No.: 17/299,556

(22) PCT Filed: Feb. 13, 2020

(86) PCT No.: PCT/KR2020/002056
§ 371 (c)(1),
(2) Date: Jun. 3, 2021

(87) PCT Pub. No.: WO2020/171478
PCT Pub. Date: Aug. 27, 2020

(65) Prior Publication Data
US 2022/0061094 A1    Feb. 24, 2022

(30) Foreign Application Priority Data

Feb. 22, 2019 (KR) .................. 10-2019-0021346
Mar. 29, 2019 (KR) .................. 10-2019-0037229

(Continued)

(51) Int. Cl.
*H04W 74/08* (2009.01)
*H04W 72/044* (2023.01)
(Continued)

(52) U.S. Cl.
CPC ..... *H04W 74/0816* (2013.01); *H04W 72/044* (2013.01); *H04W 72/542* (2023.01); *H04W 74/006* (2013.01); *H04W 74/0866* (2013.01)

(58) Field of Classification Search
CPC .......... H04W 74/0816; H04W 72/542; H04W 72/044; H04W 74/006; H04W 74/0866
See application file for complete search history.

(56) References Cited

U.S. PATENT DOCUMENTS

2018/0048511 A1   2/2018   Hakola et al.
2019/0044689 A1   2/2019   Yiu et al.
(Continued)

FOREIGN PATENT DOCUMENTS

KR   10-2018-0049750 A   5/2018
WO   2018/199685 A1   11/2018
(Continued)

OTHER PUBLICATIONS

Catt, "Summary of Offline Discussion on Remaining Minimum System Information", R1-1720169, 3GPP TSG RAN WG1 Meeting 91, Reno, USA, Nov. 28, 2017.

*Primary Examiner* — Kevin M Cunningham
(74) *Attorney, Agent, or Firm* — Rabin & Berdo, P.C.

(57) ABSTRACT

A method and an apparatus for transmitting/receiving a signal by using a variable band width in a communication system are disclosed. An operating method of a terminal comprises the steps of: receiving, from a base station, first configuration information about one or more guard bands of an unlicensed band; confirming the one or more guard bands configured in the unlicensed band on the basis of the first (Continued)

configuration information; and confirming a plurality of RB sets configured in the unlicensed band on the basis of the one or more guard bands. Therefore, performance of the communication system can be improved.

17 Claims, 10 Drawing Sheets

(30) Foreign Application Priority Data

| | | |
|---|---|---|
| May 2, 2019 | (KR) | 10-2019-0051467 |
| May 16, 2019 | (KR) | 10-2019-0057583 |
| Nov. 6, 2019 | (KR) | 10-2019-0140879 |
| Nov. 29, 2019 | (KR) | 10-2019-0157621 |
| Feb. 4, 2020 | (KR) | 10-2020-0012946 |

(51) Int. Cl.
*H04W 74/00* (2009.01)
*H04W 72/542* (2023.01)

(56) References Cited

U.S. PATENT DOCUMENTS

| | | |
|---|---|---|
| 2019/0075585 A1 | 3/2019 | Deogun et al. |
| 2019/0104416 A1 | 4/2019 | Yerramalli et al. |
| 2019/0104539 A1 | 4/2019 | Park et al. |
| 2019/0104543 A1 | 4/2019 | Park |
| 2019/0132824 A1 | 5/2019 | Jeon et al. |
| 2019/0149216 A1* | 5/2019 | Tsai ............... H04B 7/0639 370/329 |
| 2020/0112484 A1* | 4/2020 | Sun ............... H04L 5/003 |
| 2020/0267633 A1* | 8/2020 | Bendlin ............ H04W 16/14 |
| 2021/0185721 A1* | 6/2021 | Cheng ............. H04L 5/0094 |
| 2021/0400722 A1* | 12/2021 | Grant ............. H04L 27/0006 |

FOREIGN PATENT DOCUMENTS

| | | |
|---|---|---|
| WO | 2018/203389 A1 | 11/2018 |
| WO | 2018/230965 A2 | 12/2018 |
| WO | 2019/031884 A1 | 2/2019 |

\* cited by examiner

METHOD AND APPARATUS FOR TRANSMITTING/RECEIVING SIGNAL BY USING VARIABLE BAND WIDTH IN COMMUNICATION SYSTEM

TECHNICAL FIELD

The present invention relates to techniques for transmitting and receiving a signal and/or a channel in a communication system, and more particularly, to techniques for transmitting and receiving a signal and/or channel by using a variable bandwidth in a communication system.

BACKGROUND ART

With the development of information and communication technology, various wireless communication technologies have been developed. The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like. Communication technologies for satisfying the requirements of eMBB, URLLC, and mMTC are required.

In the NR communication system, communication nodes (e.g., base station and terminal) may transmit and receive signals and/or channels using a fixed bandwidth. Depending on a channel environment between the communication nodes, a variable bandwidth needs to be used instead of the fixed bandwidth. In this case, the base station should be able to transmit a signal and/or channel after variably adjusting the bandwidth, and the terminal should be able to successfully receive the signal and/or channel through the variable bandwidth. Therefore, methods for efficiently transmitting and receiving signals and/or channels using a variable bandwidth are needed.

Meanwhile, the above-described technologies are described to enhance the understanding of the background of the present disclosure, and they may include non-prior arts that are not already known to those of ordinary skill in the art.

DISCLOSURE

Technical Problem

The present invention is directed to providing a method and an apparatus for transmitting and receiving a signal and/or a channel by using a variable bandwidth in a communication system.

Technical Solution

An operation method of a terminal, according to a first exemplary embodiment of the present invention for achieving the above-described objective, may comprise receiving first configuration information of one or more guard bands of an unlicensed band from a base station, identifying the one or more guard bands configured in the unlicensed band based on the first configuration information; and identifying a plurality of resource block (RB) sets configured in the unlicensed band based on the one or more guard bands, wherein each of the one or more guard bands is located between adjacent two RB sets.

The first configuration information may include a starting guard RB (G-RB) index and an ending G-RB index of each of the one or more guard bands, and when N guard bands are configured, a number of pairs of the starting G-RB index and the ending G-RB index, which are included in the first configuration information, may be N, and N is an integer equal to or greater than 1.

The number of the plurality of RB sets configured within a bandwidth part (BWP) of the unlicensed band may be N+1.

The number of RBs included in each of the plurality of RB sets may be the number of RBs located between adjacent guard bands.

A starting RB set among the plurality of RB sets may include a starting RB of the unlicensed band to an RB just before a starting G-RB of a starting guard band among the one or more guard bands, and an ending RB set among the plurality of RB sets may include a RB after an ending G-RB of an ending guard band among the one or more guard bands to an ending RB of the unlicensed band; and the starting RB set may be an RB set having a lowest frequency resource among the plurality of RB sets, the ending RB set may be an RB set having a highest frequency resource among the plurality of RB sets, the starting guard band may be a guard band having a lowest frequency resource among the one or more guard bands, and the ending guard band may be a guard band having a highest frequency resource among the one or more guard bands.

The operation method may further comprise receiving, from the base station, second configuration information indicating whether downlink communication is performed in each of the plurality of RB sets.

The second configuration information may be a bitmap, and the bitmap may be included in downlink control information (DCI).

Resources of a channel state information-reference signal (CSI-RS) may be configured in the plurality of RB sets, and when downlink communication is not performed in one or more RB sets among the plurality of RB sets, a measurement operation on the CSI-RS may not be performed.

An operation method of a base station, according to a second exemplary embodiment of the present invention for achieving the above-described objective, may comprise configuring one or more guard bands of an unlicensed band; transmitting first configuration information of the one or more guard bands to a terminal; and performing communication with the terminal by using one or more resource block (RB) sets among a plurality of RB sets configured in frequency resources excluding the one or more guard bands in the unlicensed band, wherein a number, positions, and sizes of the plurality of RB sets are determined based on the first configuration information.

The first configuration information may include a starting guard RB (G-RB) index and an ending G-RB index of each of the one or more guard bands, and when N guard bands are configured, a number of pairs of the starting G-RB index and the ending G-RB index, which are included in the first configuration information, may be N, and N may be an integer equal to or greater than 1.

The number of the plurality of RB sets configured within a bandwidth part (BWP) of the unlicensed band may be N+1, and the number of RBs included in each of the plurality of RB sets may be the number of RBs located between adjacent guard bands.

The operation method may further comprise transmitting, to the terminal, second configuration information indicating whether downlink communication is performed in the plurality of RB sets, wherein the second configuration information may be a bitmap, and the bitmap may be included in downlink control information (DCI).

Resources of a channel state information-reference signal (CSI-RS) may be configured in the plurality of RB sets, and when downlink communication is not performed in one or more RB sets among the plurality of RB sets, a measurement result on the CSI-RS may not be received from the terminal.

The operation method may further comprise transmitting, to the terminal, third configuration information of a control resource set (CORESET) configured in the unlicensed band and fourth configuration information of a search space configured in the unlicensed band, wherein the third configuration information may be commonly applied to the plurality of RB sets, and the number of RBs in which the CORESET is disposed may be equal to or less than the number of RBs belonging to one RB set.

The third configuration information may include an offset indicating a position of the CORESET in a frequency axis, and the offset may indicate a difference between a starting RB of the unlicensed band and a starting RB of the CORESET.

The search space associated with the CORESET may be repeated in the plurality of RB sets, and the fourth configuration information may include a field indicating whether the search space is configured in each of the plurality of RB sets.

A terminal, according to a third exemplary embodiment of the present invention for achieving the above-described objective, may comprise a processor and a memory storing at least one instruction executable by the processor, wherein the at least one instruction causes the processor to: receive first configuration information of one or more guard bands of an unlicensed band from a base station; identify the one or more guard bands configured in the unlicensed band based on the first configuration information; identify a plurality of resource block (RB) sets configured in the unlicensed band based on the one or more guard bands; and receive, from the base station, second configuration information of a control resource set (CORESET) configured in the unlicensed band and third configuration information of a search space configured in the unlicensed band, wherein the second configuration information is commonly applied to the plurality of RB sets, and a number of RBs in which the CORESET is disposed is equal to or less than a number of RBs belonging to one RB set.

The first configuration information may include a starting guard RB (G-RB) index and an ending G-RB index of each of the one or more guard bands; when N guard bands are configured, a number of pairs of the starting G-RB index and the ending G-RB index, which are included in the first configuration information, may be N, a number of the plurality of RB sets configured within a bandwidth part (BWP) of the unlicensed band may be N+1, and N may be an integer equal to or greater than 1.

The second configuration information may include an offset indicating a position of the CORESET in a frequency axis, and the offset may indicate a difference between a starting RB of the unlicensed band and a starting RB of the CORESET.

The search space associated with the CORESET may be repeated in the plurality of RB sets, and the third configuration information may include a field indicating whether the search space is configured in each of the plurality of RB sets.

Advantageous Effects

According to the present invention, the base station can transmit configuration information of guard band(s) configured within a bandwidth part (BWP) of an unlicensed band to the terminal. The terminal can identify the guard band(s) configured within the BWP based on the configuration information received from the base station, and can estimate the number, positions, and sizes of resource block (RB) sets configured within the BWP based on the guard band(s).

In addition, the base station can transmit configuration information of a control resource set (CORESET) and a search space configured within the BWP to the terminal. The terminal can identify the CORESET and search space configured within the BWP based cm the configuration information received from the base station. In addition, the base station can transmit configuration information indicating RB set(s) used for downlink communication among the configured RB sets to the terminal. The terminal can identify the RB set(s) used for downlink communication based on the configuration information received from the base station.

In the unlicensed band, communication between the base station and the terminal may be performed using the RB set(s), the CORESET, and the search space configured by the base station. Therefore, the communication between the base station and the terminal can be performed using a variable bandwidth, and the performance of the communication system can be improved.

MODES OF THE INVENTION

Figure 1:
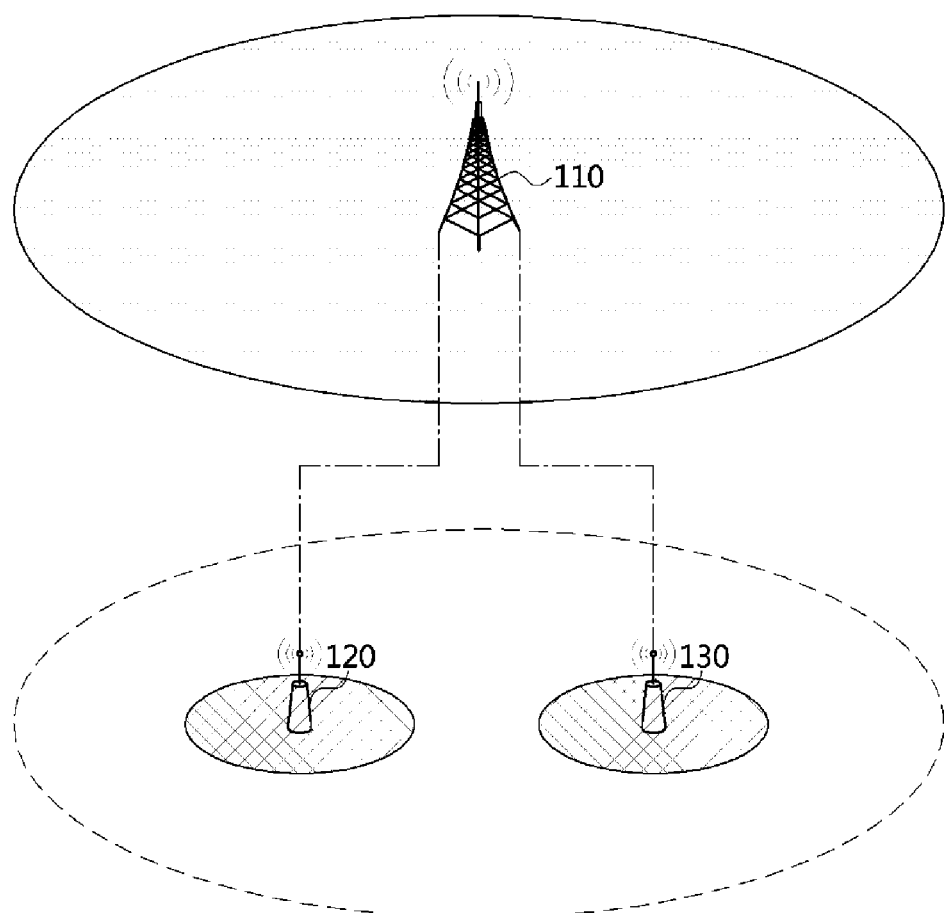
FIG. 1 is a conceptual diagram illustrating a first exemplary embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which exemplary embodiments according to the present invention will be described. However, the communication system to which exemplary embodiments according to the present invention are applied are not restricted to what will be described below. That is, the exemplary embodiments according to the present invention may be applied to various communication systems. Here, the term 'communication system' may be used with the same meaning as the term 'communication network'.

FIG. 1 is a conceptual diagram illustrating a first exemplary embodiment of a communication system.

Referring to FIG. 1, a first base station 110 may support a cellular communication (e.g., long term evolution (LTE), LTE-advance (LTE-A), LTE-A Pro, LTE-unlicensed (LTE-U), new radio (NR), and NR-unlicensed (NR-U) specified in the $3^{rd}$ generation partnership project (3GPP)), or the like. The first base station 110 may support multiple input multiple output (MIMO) (e.g., single-user MIMO (SU-MIMO), multi-user MIMO (MU-MIMO), massive MIMO, etc.), coordinated multipoint (CoMP), carrier aggregation (CA), or the like.

The first base station 110 may operate in a frequency band F1 and may form a macro cell. The first base station 110 may be connected to another base station (e.g., second base station 120, third base station 130, etc.) through an ideal backhaul or a non-ideal backhaul. The second base station 120 may be located within the coverage of the first base station 110. The second base station 120 may operate in a frequency band F2 and may form a small cell. The communication scheme (e.g., NR) supported by the second base station 120 may be different from the communication scheme of the first base station 110.

The third base station 130 may be located within the coverage of the first base station 110. The third base station 130 may operate in the frequency band F2 and may form a small cell. The communication scheme (e.g., NR) supported by the third base station 120 may be different from the communication scheme of the first base station 110. Each of the first base station 110 and a user equipment (UE) (not shown) connected to the first base station 110 may transmit and receive signals through a carrier aggregation (CA) between the frequency band F1 and the frequency band F2. Alternatively, each of the UE connected to the first base station 110 and the first base station 110 may support dual-connectivity (DC) for the frequency band F1 and the frequency band F2, and may transmit and receive signals in the DC environment.

The communication node (i.e., base station, terminal, etc.) constituting the wireless communication network described above may supporting a code division multiple access (CDMA) based communication protocol, a wideband CDMA (WCDMA) based communication protocol, a time division multiple access (TDMA) based communication protocol, a frequency division multiple access (FDMA) based communication protocol, a single carrier-FDMA (SC-FDMA) based communication protocol, an orthogonal frequency division multiplexing (OFDM) based communication protocol, an orthogonal frequency division multiple access (OFDMA) based communication protocol, or the like.

Among the communication nodes, the base station may be referred to as a Node B, an evolved Node B, a 5G Node B (gNodeB), a base transceiver station (BTS), a radio base station, a radio transceiver, an access point, an access node, a transmission/reception point (Tx/Rx Point), or the like.

Among the communication nodes, the terminal may be referred to as a user equipment (UE), an access terminal, a mobile terminal, a station, a subscriber station, a portable subscriber station, a mobile station, a node, a device, or the like. The communication node may have the following structure.

Figure 2:
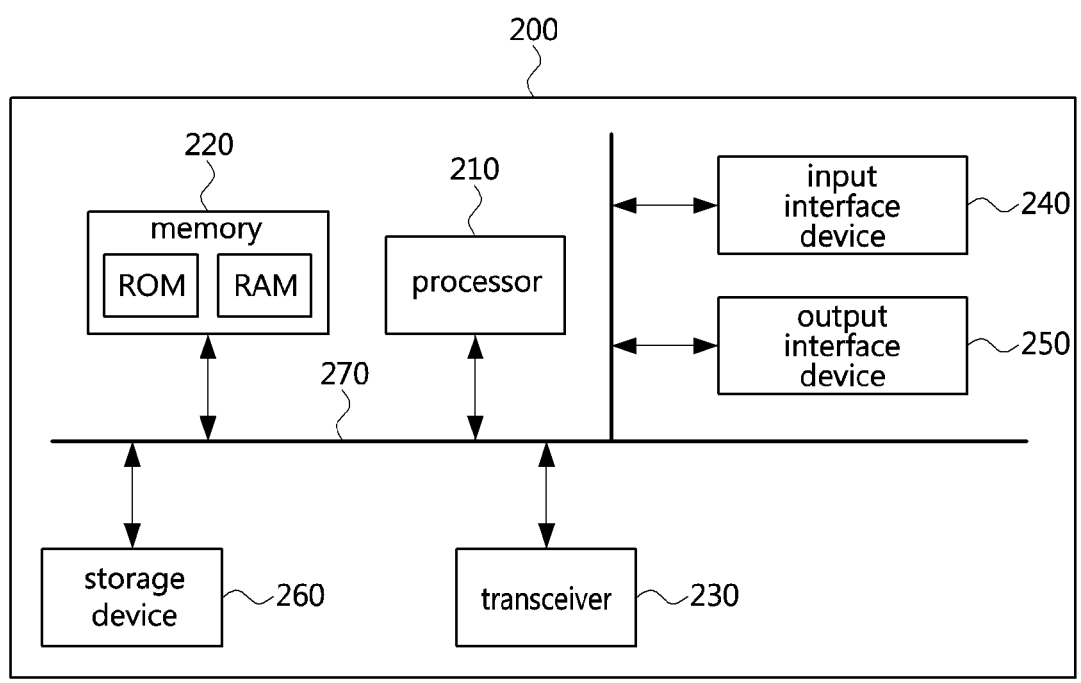
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Hereinafter, operation methods of a communication node in a communication network will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Figure 3:
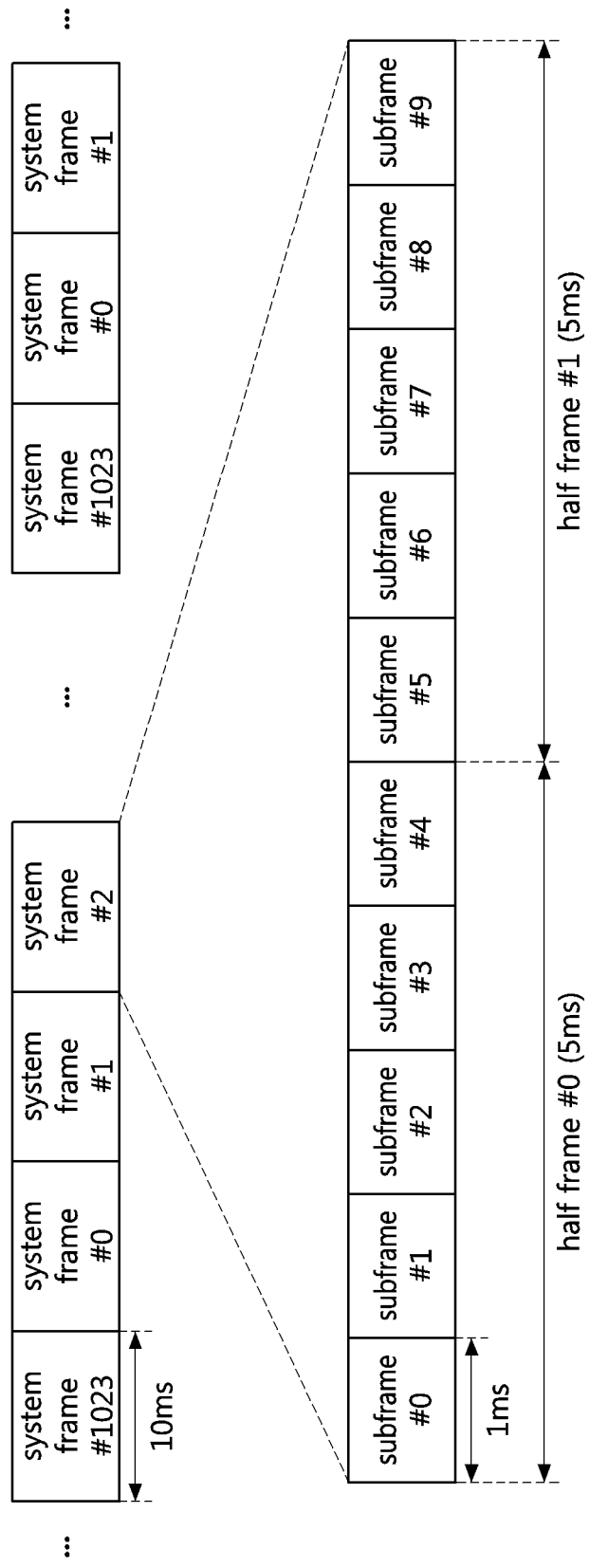
FIG. 3 is a conceptual diagram illustrating a first exemplary embodiment of a system frame in a communication system.

FIG. 3 is a conceptual diagram illustrating a first exemplary embodiment of a system frame in a communication system.

Referring to FIG. 3, time resources in a communication network may be divided into frames. For example, system frames each of which has a length of 10 milliseconds (ms) may be configured consecutively in the time axis of the communication system. System frame numbers (SFNs) may be set to #0 to #1023. In this case, 1024 system frames may be repeated in the time axis of the communication system. For example, an SFN of a system frame after the system frame #1023 may be set to #0.

One system frame may comprise two half frames, and the length of one half frame may be 5 ms. A half frame located in a starting region of a system frame may be referred to as a 'half frame #0', and a half frame located in an ending region of the system frame may be referred to as a 'half frame #1'. The system frame may include subframes, and the length of one subframe may be 1 ms. 10 subframes within one system frame may be referred to as 'subframes #0 to #9'.

Figure 4:
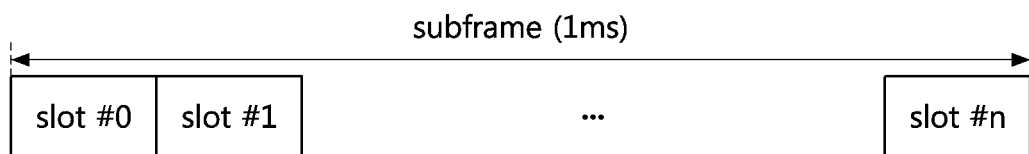
FIG. 4 is a conceptual diagram illustrating a first exemplary embodiment of a subframe in a communication system.

FIG. 4 is a conceptual diagram illustrating a first exemplary embodiment of a subframe in a communication system.

Referring to FIG. 4, one subframe may include n slots, and n may be a natural number. Accordingly, one subframe may be composed of one or more slots.

Figure 5:
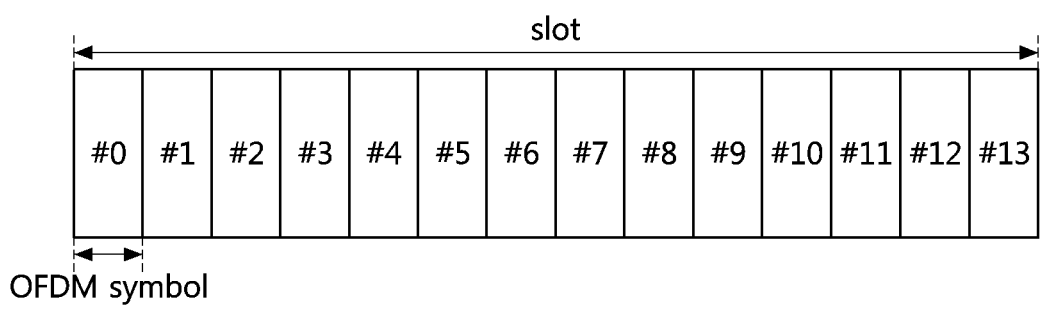
FIG. 5 is a conceptual diagram illustrating a first exemplary embodiment of a slot in a communication system.
Figure 6:
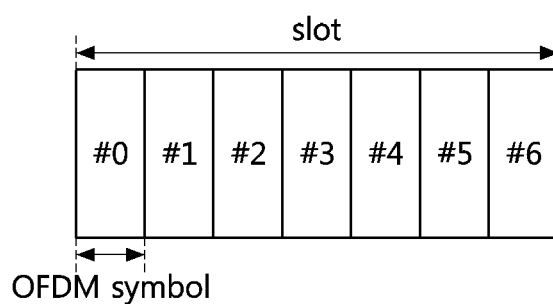
FIG. 6 is a conceptual diagram illustrating a second exemplary embodiment of a slot in a communication system.

FIG. 5 is a conceptual diagram illustrating a first exemplary embodiment of a slot in a communication system, and FIG. 6 is a conceptual diagram illustrating a second exemplary embodiment of a slot in a communication system.

Referring to FIG. 5 and FIG. 6, one slot may comprise one or more symbols. One slot shown in FIG. 5 may be composed of 14 symbols. One slot shown in FIG. 6 may be composed of 7 symbols. Here, the length of the slot may vary depending on the number of symbols included in the slot and the length of the symbol. Alternatively, the length the slot may vary according to a numerology. When a subcarrier spacing is 15 kHz (e.g., $\mu=0$), the length of the slot may be 1 ms. In this case, one system frame may include 10 slots. When the subcarrier spacing is 30 kHz (e.g., $\mu=1$), the length of the slot may be 0.5 ms. In this case, one system frame may include 20 slots.

When the subcarrier spacing is 60 kHz (e.g., $\mu=2$), the length of the slot may be 0.25 ms. In this case, one system frame may include 40 slots. When the subcarrier spacing is 120 kHz (e.g., $\mu=3$), the length of the slot may be 0.125 ms. In this case, one system frame may include 80 slots. When the subcarrier spacing is 240 kHz (e.g., $\mu=4$), the length of the slot may be 0.0625 ms. In this case, one system frame may include 160 slots.

The symbol may be configured as a downlink (DL) symbol, a flexible symbol, or an uplink (UL) symbol. A slot composed only of DL symbols may be referred to as 'DL slot', a slot composed only of FL symbols may be referred to as 'FL slots', and a slot composed only of UL symbols may be referred to as 'UL slot'.

Figure 7:
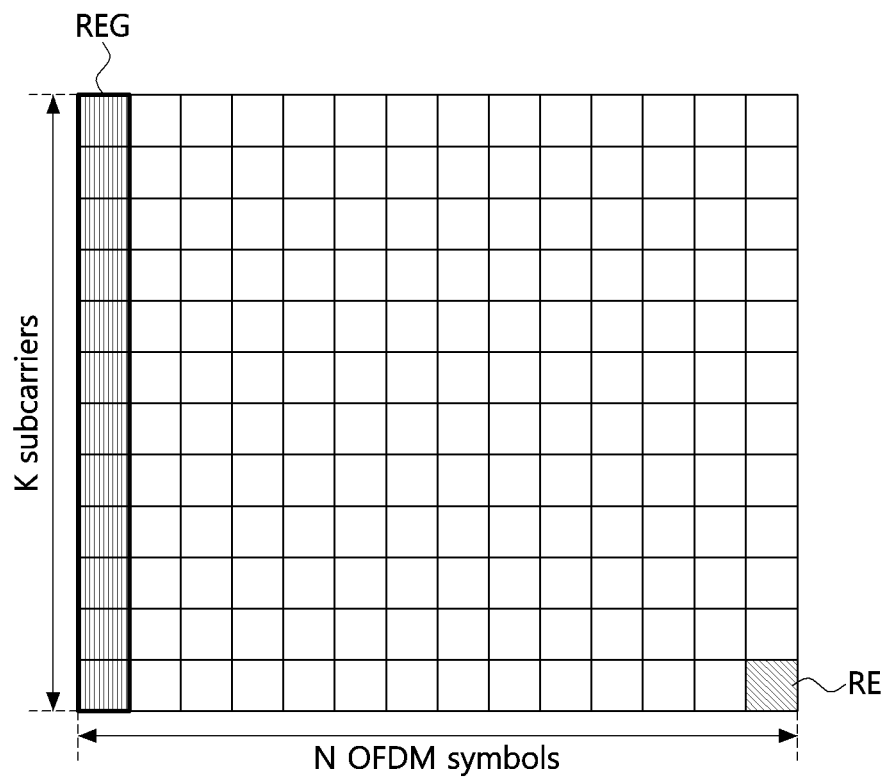
FIG. 7 is a conceptual diagram illustrating a first exemplary embodiment of time-frequency resources in a communication system.

FIG. 7 is a conceptual diagram illustrating a first exemplary embodiment of time-frequency resources in a communication system.

Referring to FIG. 7, a resource configured with one OFDM symbol in the time axis and one subcarrier in the frequency axis may be defined as a 'resource element (RE)'. Resources configured with one OFDM symbol in the time axis and K subcarriers in the frequency axis may be defined as a 'resource element group (REG)'. One REG may include K REs. The REG may be used as a basic unit of resource allocation in the frequency axis. K may be a natural number. For example, K may be 12. N may be a natural number. N in the slot shown in FIG. 5 may be 14, and N in the slot shown in FIG. 6 may be 7. The N OFDM symbols may be used as a basic unit of resource allocation in the time axis.

In the following exemplary embodiments, methods for transmitting and receiving data in a communication system will be described. Downlink data may be transmitted on a physical downlink shared channel (PDSCH). The base station may transmit configuration information of the PDSCH to the terminal on a physical downlink control channel (PDCCH). The terminal may obtain the configuration information (e.g., scheduling information) of the PDSCH by receiving the PDCCH (e.g., downlink control information (DCI)). For example, the configuration information of the PDSCH may include a modulation and coding scheme (MCS) used for transmission and reception of the PDSCH, time resource information of the PDSCH, and frequency resource information of the PDSCH. The PDSCH may refer to radio resources through which the downlink data is transmitted and received. Alternatively, the PDSCH may mean the downlink data itself. The PDCCH may refer to radio resources through which the downlink control information (e.g., DCI) is transmitted and received. Alternatively, the PDCCH may refer to the downlink control information itself.

Figure 8:
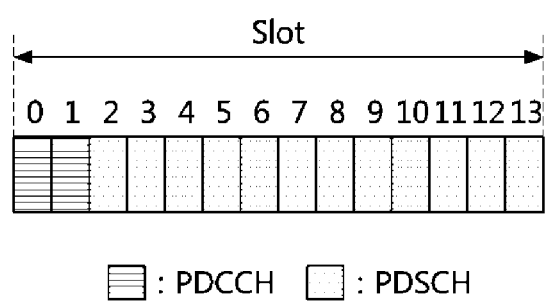
FIG. 8 is a conceptual diagram illustrating a third exemplary embodiment of a slot in a communication system.

FIG. 8 is a conceptual diagram illustrating a third exemplary embodiment of a slot in a communication system.

Referring to FIG. 8, one slot may include 14 symbols in the time axis (e.g., time domain). Here, the symbol may be an OFDM symbol. Among the 14 symbols, some symbol(s) may be configured as the PDCCH, and the remaining symbols may be configured as the PDSCH. The PDCCH may be mapped from the starting symbol (e.g., symbol #0) of the slot. For example, the PDCCH may be mapped to the symbols #0 and #1. The PDSCH may be mapped from the symbol (e.g., symbol #2) after the ending symbol (e.g., symbol #1) of the PDCCH. For example, the PDSCH may be mapped to the symbols #2 to #13. The above-described mapping scheme may be referred to as 'PDSCH mapping type A'. That is, when the PDSCH mapping type A is used, the PDCCH may be mapped from the starting symbol of the slot, and the PDSCH may be mapped from the symbol after the ending symbol of the PDCCH. In this case, the length of the PDSCH in the time axis may be 4, 5, 6, 7, 8, 9, 10, 11, 12, or 13 symbols.

Figure 9:
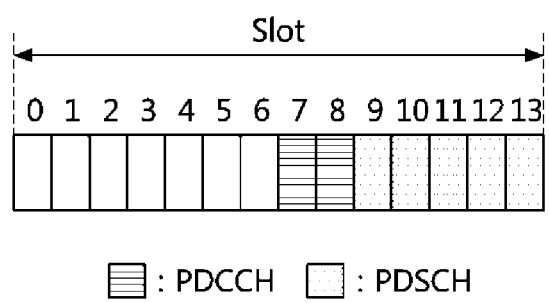
FIG. 9 is a conceptual diagram illustrating a fourth exemplary embodiment of a slot in a communication system.

FIG. 9 is a conceptual diagram illustrating a fourth exemplary embodiment of a slot in a communication system.

Referring to FIG. 9, one slot may include 14 symbols in the time axis. The PDCCH may be mapped to arbitrary symbol(s) in the slot. That is, the PDCCH may not be mapped to the starting symbol (e.g., slot #0) of the slot. For example, the PDCCH may be mapped to the symbols #7 and #8. The PDSCH may be mapped from the symbol (e.g., symbol #9) after the ending symbol (e.g., symbol #8) of the PDCCH. For example, the PDSCH may be mapped to the symbols #9 to #13. The above-described mapping scheme may be referred to as 'PDSCH mapping type B'. That is, when the PDSCH mapping type B is used, the PDCCH may be mapped to arbitrary symbol(s) in the slot, and the PDSCH may be mapped from the symbol after the ending symbol of the PDCCH. In this case, the length of the PDSCH in the time axis may be 2, 4, or 7 symbols.

In the following exemplary embodiments, PDCCH monitoring methods will be described. The terminal may perform a PDCCH monitoring operation in order to receive a PDSCH transmitted from the base station. The base station may inform the terminal of configuration information for the PDCCH monitoring operation using a higher layer message (e.g., radio resource control (RRC) message). The configuration information for the PDCCH monitoring operation may include control resource set (CORESET) information and search space information.

The CORESET information may include PDCCH demodulation reference signal (DMRS) information, precoding information of the PDCCH, and PDCCH occasion information. The PDCCH DMRS may be a DMRS used to demodulate a PDCCH. The PDCCH occasion may be a region where a PDCCH may exist. That is, the PDCCH occasion may be a region in which DCI can be transmitted. The PDCCH occasion information may include time resource information and frequency resource information of the PDCCH occasions. The length of the PDCCH occasion in the time axis may be indicated in units of symbols. The size of the PDCCH occasion in the frequency axis may be indicated in units of RBs (e.g., physical resource blocks (PRBs) or common resource blocks (CRBs)).

The search space information may include an identifier (ID) of a CORESET associated with a search space, a periodicity and an offset of the PDCCH monitoring. Each of the periodicity and the offset of the PDCCH monitoring may be indicated in units of slots. In addition, the search space information may further include an index of a symbol where the PDCCH monitoring operation is started.

Figure 10:
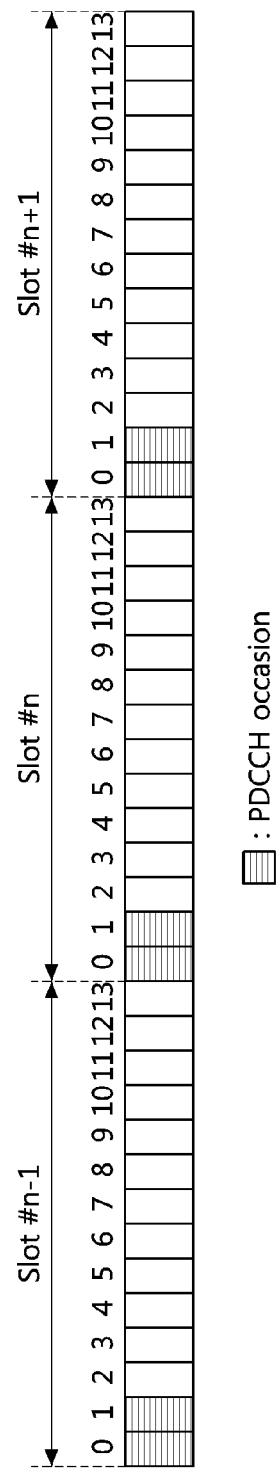
FIG. 10 is a conceptual diagram illustrating a first exemplary embodiment of a PDCCH monitoring method in a communication system.

FIG. 10 is a conceptual diagram illustrating a first exemplary embodiment of a PDCCH monitoring method in a communication system.

Referring to FIG. 10, the terminal may identify the position of the PDCCH occasions based on the CORESET information and the search space information, and may perform the monitoring operation in the PDCCH occasion. The search space information may include a CORESET ID, and may be associated with the CORESET information having the corresponding CORESET ID. The length of the PDCCH occasion in the time axis may be two symbols. The periodicity of the PDCCH monitoring may be one slot, and the offset of the PDCCH monitoring may be 0. The symbol where the PDCCH monitoring operation is started may be the symbol #0 within the slot. The terminal may perform the PDCCH monitoring operation for each slot. The PDCCH monitoring operation may be performed in the symbols #0 and #1 within the slot.

In the following exemplary embodiments, methods for transmitting and receiving signals and/or channels using a variable bandwidth will be described. The signal may refer to a reference signal or a synchronization signal. The reference signal may be a channel state information (CSI)-RS, DMRS, tracking reference signal (TRS), cell reference signal (CRS), discovery reference signal (DRS), or the like. The synchronization signal may be a primary synchronization signal (PSS), a secondary synchronization signal (SSS), or the like. The channel may be a downlink channel, a broadcast channel, an uplink channel, a si delink channel, or the like. The downlink channel may be a PDCCH, a PDSCH, or the like. The broadcast channel may be a physical broadcast channel (PBCH). The uplink channel may be a physical uplink shared channel (PUSCH), a physical uplink control channel (PUCCH), or the like. The sidelink channel may be a physical sidelink shared channel (PSSCH), a physical sidelink control channel (PSCCH), a physical sidelink discovery channel (PSDCH), a physical sidelink feedback channel (PSFCH), or the like.

The base station may configure a bandwidth part (BWP) for downlink communication. The BWP may be configured differently for each terminal. The base station may inform the terminal of configuration information of the BWP using higher layer signaling. The number of BWPs configured for one terminal may be equal to or greater than 1. The terminal may receive the configuration information of the BWP from the base station, and may identify the BWP(s) configured by the base station based on the configuration information of the BWP. When a plurality of BWPs are configured for downlink communication, the base station may activate one or more BWPs among the plurality of BWPs. The base station may transmit configuration information of the activated BWP(s) to the terminal using one or more among higher layer signaling, a medium access control (MAC) control element (CE), and DCI. The base station may perform downlink communication using the activated BWP(s). The terminal may identify the activated BWP(s) by receiving the configuration information of the activated BWP(s) from the base station, and may perform a downlink reception operation in the activated BWP(s).

Meanwhile, in an unlicensed band, the base station may perform a listen before talk (LBT) operation to transmit a downlink signal and/or channel. That is, the base station may identify whether radio resources are used by another communication node by performing the LBT operation. When it is determined that radio resources are not used by another communication node as a result of the LBT operation, the base station may transmit a downlink signal and/or channel using the radio resources. When it is determined that the radio resources are used by another communication node as the result of the LBT operation, the base station may not transmit a downlink signal and/or channel using the radio resources.

Figure 11:
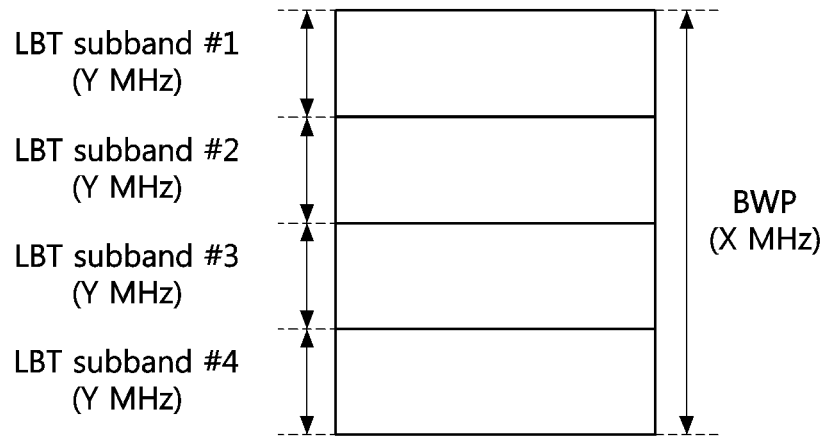
FIG. 11 is a conceptual diagram illustrating a first exemplary embodiment of an LBT subband in a communication system.

FIG. 11 is a conceptual diagram illustrating a first exemplary embodiment of an LBT subband in a communication system.

Referring to FIG. 11, the LBT operation may be performed on an LBT subband basis. The width of each of the LBT subbands may be different. Alternatively, the width of each of the LBT subbands may be the same. One LBT subband may include one or more RBs Here, the RB may be a PRB or a CRB. The LBT subband may be referred to as 'RB set' or 'LBT bandwidth'. The width of the BWP for downlink communication may be X MHz. The BWP may include one or more LBT subbands.

The width of the LBT subband may be Y MHz. The LBT subband(s) may be configured by the base station. The base station may inform the terminal of configuration information of the LBT subband(s) using one or more among a higher layer message, a MAC CE, and DCI. The terminal may receive the configuration information of the LBT subband(s) from the base station, and may identify the LBT subband(s) configured by the base station based on the configuration information. The width of the LBT subband(s) may be less than or equal to the width of the BWP. For example, X may be 80 and Y may be 20. The base station may perform the LBT operation in each of the LBT subbands #1 to #4, and may transmit a signal and/or channel in LBT subband(s) where the LBT operation is successful. The signal and/or channel may be transmitted within a channel occupancy time (COT) secured by the base station.

The LBT subband(s) (e.g., RB set(s)) may be configured within one BWP, one cell, or one carrier. The base station may transmit configuration information of the LBT subband(s) to the terminal using one or more among higher layer signaling, a MAC CE, and DCI. The configuration information of the LBT subband(s) may include one or more among starting position information, ending position information, and size information of the LBT subband in the frequency axis. The starting position information of the LBT subband may be an index of a starting RB, and the end position information of the LBT subband may be an index of an ending RB. The starting RB may be a starting PRB or a starting CRB, and the ending RB may be an ending PRB or an ending CRB. The starting RB may be an RB having the lowest frequency (e.g., RB having the smallest index) among RBs belonging to the LBT subband. The ending RB may be an RB having the highest frequency (e.g., RB having the largest index) among the RBs belonging to the LBT subband. The size information of the LBT subband may indicate the number of the RBs belonging to the LBT subband.

Information indicating the sizes of all the LBT subbands belonging to the BWP may be set to a common size value. The positions of the LBT subbands may be indicated by the common size value and offsets thereof. Each offset may be an interval from a specific point (e.g., point A) to the starting point (e.g., starting RB), a center point (e.g., center RB), or the ending point (e.g., ending RB) of each of the LBT subbands. Here, the specific point may be a starting frequency position of the carrier (e.g., starting subcarrier position or starting RB), a starting frequency position of the BWP (e.g., starting subcarrier position or starting RB), or the point A for CRBs (e.g., CRB grid). The offset may be configured in units of RBs. The center RB may be an RB having a center frequency (e.g., RB having a center index) among the RBs belonging to the LBT subband.

Figure 12:
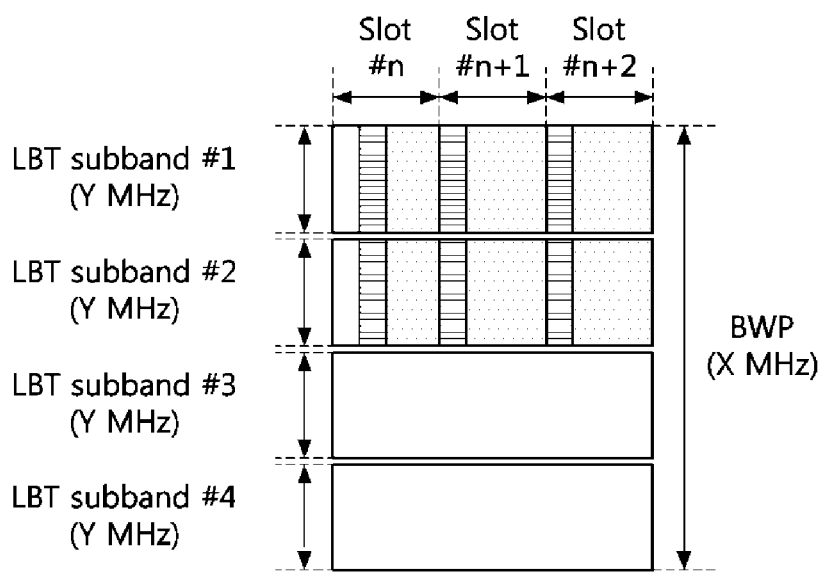
FIG. 12 is a conceptual diagram illustrating a first exemplary embodiment of a communication method using an LBT subband in a communication system.

FIG. 12 is a conceptual diagram illustrating a first exemplary embodiment of a communication method using an LBT subband in a communication system.

Referring to FIG. 12, the base station may configure N LBT subbands within the BWP N may be an integer equal to or greater than 1. The sizes (e.g., widths) of the N LBT subbands in the frequency axis may be the same. Therefore, the sizes of the N LBT subbands may be indicated by the same value (e.g., common size value). The common size value may be configured in units of RBs (e.g., CRB units). For example, each of the N LBT subbands may include K RBs. The position of each of the N LBT subbands may be indicated by a specific point and an offset. For example, the offset indicating the position of the LBT subband #1 may be n1, and the offset indicating the position of the LBT subband #2 may be n2. In the frequency axis, the offset may be an interval between the specific point and the starting point, the center point, or the ending point of the corresponding LBT subband. The offset may be configured in units of RBs.

The base station may inform the terminal of the configuration information of the LBT subbands using one or more among higher layer signaling, a MAC CE, and DCI. The terminal may receive the configuration information of the LBT subbands from the base station, and may identify the number, the sizes (e.g., sizes in the frequency axis), and the positons of the LBT subbands based on the configuration information. The configuration information of the LBT subbands may include information indicating the sizes, the offsets, the specific point, etc. of the LBT subbands.

The base station may configure intra-carrier guard bands between LBT subbands within one carrier. The intra-carrier guard band may be a guard band between the LBT subbands. The intra-carrier guard band may be located at the edge of the LBT subband in the frequency axis. The intra-carrier guard band may be located between the adjacent LBT subbands. The base station may inform the terminal of configuration information of the intra-carrier guard bands using one or more among higher layer signaling, a MAC CE, and DCI.

The configuration information of the intra-carrier guard bands may include information indicating the size, number, and positions of the intra-carrier guard bands in the frequency axis. The size of the intra-carrier guard band may be configured in units of RBs (e.g., CRB units). The RB in which the intra-carrier guard band is located may be referred to as guard-RB (G-RB). The size of the intra-carrier guard band may not be configured by the base station. In this case, the size of the intra-carrier guard band may be a size defined in the 3GPP technical specification. When the number of LBT subbands configured within the BWP or carrier is N, the number of intra-carrier guard bands configured within the BWP or carrier may be N−1. Alternatively, when the number of intra-carrier guard bands configured within the BWP or carrier is N−1, the number of LBT subbands configured within the BWP or carrier may be equal to or greater than N.

The position of the intra-carrier guard band in the frequency axis may be indicated by a specific point and an offset. The offset may be configured in units of RBs. The specific point may be a starting point (e.g., starting G-RB), a center point (e.g., center G-RB), or an ending point (e.g., ending G-RB) of an LBT subband adjacent to the intra-carrier guard band. Alternatively, the specific point may be the starting point (e.g., starting RB) of the BWP to which the intra-carrier guard band belongs or the point A of the CRBs (e.g., CRB grid).

The configuration information of the intra-carrier guard bands may include starting point information (e.g., starting G-RB index) and ending point information (e.g., ending G-RB index) of the intra-carrier guard bands. In this case, the intra-carrier guard band in the frequency axis may be composed of RBs from the starting G-RB to the ending G-RB. The G-RB index may be indicated based on a CRB index. When m intra-carrier guard bands are configured within the BWP, carrier, or cell of the unlicensed band, the number of pairs between the starting G-RB and the ending G-RB of the respective intra-carrier guard bands included in the configuration information may be m. m may be an integer equal to or greater than 1.

The terminal may receive the configuration information of the intra-carrier guard bands from the base station, and may identify the intra-carrier guard band(s) configured within the BWP, carrier, or cell of the unlicensed band, and identify the LBT subband(s) (e.g., RB set(s)) configured within the BWP, carrier, or cell based on the configuration of the intra-carrier guard band(s).

When the number of pairs of the starting G-RB and the ending G-RB of the respective intra-carrier guard bands included in the configuration information is m, the terminal may determine that (m+1) LBT subbands are configured within the BWP, carrier, or cell of the unlicensed band. The terminal may determine that the starting LBT subband among the (m+1) LBT subbands includes the starting RB (e.g., starting CRB) of the BWP (or, carrier or cell) of the unlicensed band to an RB just before (i.e., RB having the lower frequency than) the starting RB (e.g., starting CRB) of the starting intra-carrier guard band among the m intra-carrier guard bands. The starting LBT subband may be an LBT subband having the lowest frequency resource among the LBT subbands. The starting intra-carrier guard band may be an intra-carrier guard band having the lowest frequency resource among the intra-carrier guard bands. The starting RB may be an RB having the lowest frequency resource among specific RBs.

The terminal may determine that the ending LBT subband among the (m+1) LBT subbands includes an RB just after (i.e., RB having the higher frequency than) the ending RB (e.g., ending CRB) of the ending intra-carrier guard band among the m intra-carrier guard band(s) to the ending RB (e.g., ending CRB) of the BWP (or, carrier or cell) of the unlicensed band. The ending LBT subband may be an LBT subband having the highest frequency resource among the LBT subbands. The ending intra-carrier guard band may be an intra-carrier guard band having the highest frequency resource among the intra-carrier guard bands. The ending RB may be an RB having the highest frequency resource among specific RBs.

The terminal may determine that each of the remaining LBT subbands excluding the starting LBT subband and the ending LBT subband among the (m+1) LBT subbands includes an RB just after the ending RB (e.g., ending CRB) of the intra-carrier guard band #p to an RB just before the starting RB (e.g., starting CRB) of the intra-carrier guard band #p+1. The LBT subband estimated by the terminal may be located between the intra-carrier guard band #p and the intra-carrier guard band #p+1. The frequency of the intra-carrier guard band #p may be lower than the frequency of the intra-carrier guard band #p+1. P may be an integer equal to or greater than 1.

Based on the above-described methods, the base station may configure a plurality of intra-carrier guard bands within the carrier or cell. For example, the base station may inform the terminal of the starting RB index (S1) and the ending RB index (E1) of the intra-carrier guard band (G1). The terminal may identify the intra-carrier guard band G1 configured by the base station based on the starting RB index S1 and the ending RB index E1. In addition, the base station may inform the terminal of the starting RB index (S2) and the ending RB index (E2) of the intra-carrier guard band (G2). The terminal may identify the intra-carrier guard band G2 configured by the base station based on the starting RB index S2 and the ending RB index E2. The base station may transmit configuration information of N intra-carrier guard bands within the carrier or cell to the terminal using one or more among higher layer signaling, a MAC CE, and DCI. The terminal may receive the configuration information of the N intra-carrier guard bands from the base station, and may identify the N intra-carrier guard bands based on the configuration information.

Each of the base station and the terminal may identify available RB(s) (e.g., LBT subband(s), RB set(s)) based on the configuration information of the intra-carrier guard bands. For example, each of the base station and the terminal may determine RB(s) excluding the intra-carrier guard band(s) in the BWP, carrier, or cell as the available RB(s). The RB(s) available in the BWP, carrier or cell may be RB(s) located between the intra-carrier guard band G1 and the intra-carrier guard band G2. The RB(s) available in the BWP, carrier or cell may be RB(s) from an RB just after the ending RB of the intra-carrier guard band G1 to an RB just before the starting RB of the intra-carrier guard band G2.

The available RB(s) may be the above-described LBT subband(s) or RB set(s). The base station may configure an intra-carrier guard band for downlink communication, and may configure an intra-carrier guard band for uplink communication. The intra-carrier guard band for downlink communication may be configured independently of the intra-carrier guard band for uplink communication. The base station may transmit configuration information of the intra-carrier guard band for downlink communication and configuration information of the intra-carrier guard band for uplink communication to the terminal using one or more among higher layer signaling, a MAC CE, and DCI.

The positions of the intra-carrier guard bands in the frequency axis may be predefined. When the intra-carrier guard bands are not separately configured, the base station and the terminal may identify the positions of the intra-carrier guard bands and the available resources (e.g., RBs, LBT subbands, RB sets) based on the predefined intra-carrier guard band configuration. For example, the center position of the intra-carrier guard band (e.g., center frequency or center RB) may be defined as a position having the same frequency offset from two LBT subbands adjacent to the corresponding intra-carrier guard band. In the exemplary embodiment shown in FIG. 12, the center position of the intra-carrier guard band existing between the LBT subband #1 and the LBT subband #2 may be a center frequency between the center frequency of the LBT subband #1 and the center frequency of the LBT subband #2, or a center RB between the center RB of the LBT subband #1 and the center RB of the LBT subband #2. The number, positions, or sizes of the intra-carrier guard bands may be predefined.

The terminal may receive the configuration information of the intra-carrier guard bands from the base station through one or more among higher layer signaling, a MAC CE, and DCI, and may identify the configuration of the LBT subbands based on the configuration information of the intra-carrier guard bands. When the configuration information of the intra-carrier guard bands is not received from the base station, the terminal may use the predefined intra carrier guard band configuration (e.g., defined in 3GPP technical specification).

The base station and the terminal may not perform a signal and/or channel transmission/reception operation in the intra-carrier guard band. The terminal may not perform a radio resource management (RRM) measurement operation in the intra-carrier guard band. For example, the terminal may perform the RRM measurement operation in the remaining frequency resources except the intra-carrier guard bands within the BWP, carrier, or cell.

The base station may transmit downlink scheduling information or uplink scheduling information to the terminal. The downlink scheduling information may include PDSCH allocation information, and radio resources (e.g., frequency band) indicated by the PDSCH allocation information may include intra-carrier guard band(s). In this case, the terminal may perform a rate matching operation or a puncturing operation on the intra-carrier guard band(s) in a PDSCH transmission procedure. The uplink scheduling information may include PUSCH allocation information, and radio resources (e.g., frequency band) indicated by the PUSCH allocation information may include intra-carrier guard band(s). In this case, the terminal may perform a rate matching operation or a puncturing operation on the intra-carrier guard band(s) in a PUSCH transmission procedure.

The LBT operation may succeed in one or more LBT subbands among all the LBT subbands included in the activated BWP, and the LBT operation may fail in the remaining LBT subband(s). In this case, the base station may transmit a signal and/or channel as in the following exemplary embodiments. In the exemplary embodiment shown in FIG. 12, the base station may perform the LBT operation in four LBT subbands. For example, the base station may perform an energy detection operation in the LBT subband, and when a detected energy level is less than or equal to a threshold, the terminal may determine that transmission of a signal and/or channel is possible in the corresponding LBT subband. That is, the base station may determine that the LBT operation is successful in the corresponding LBT subband.

On the other hand, when the detected energy level in the LBT subband exceeds the threshold, the base station may determine that transmission of a signal and/or channel is impossible in the corresponding LBT band. That is, the base station may determine that the LBT operation fails in the corresponding LBT subband. The base station may transmit a signal and/or channel in one or more LBT subbands in which the LBT operation is successful among all the LBT subbands included in the activated BWP. The base station may perform a rate matching operation or a puncturing operation on the LBT subband(s) in which the LBT operation is unsuccessful.

In the exemplary embodiment shown in FIG. 12, the base station may determine that transmission of a signal and/or channel is possible in the LBT subbands #1 and #2, and transmission of a signal and/or channel is impossible in the LBT subbands #3 and #4. Accordingly, the base station may transmit a signal and/or channel using the LBT subbands #1 and #2 according to the result of performing the LBT operation.

When the LBT operation is successful in some LBT subband(s) among all the LBT subbands included in the BWP, the base station may inform the terminal of information indicating whether downlink communication is performed in the some LBT subband(s) where the LBT operation is successful (hereinafter, referred to as 'DL indication information') through one or more among a higher layer message, a MAC CE, and DCI. The DL indication information may indicate whether downlink communication is performed in the LBT subbands within the BWP, carrier, or cell. The terminal may receive the DL indication information from the base station.

When it is determined that downlink communication is performed in the some LBT subband(s) where the LBT operation is successful, the terminal may estimate the BWP or LBT subband(s) where downlink communication is performed based on the DL indication information. Therefore, the terminal may perform a downlink monitoring operation in the estimated BWP or the estimated LBT subband(s). In addition, the terminal may not perform a downlink monitoring operation in the LBT subband(s) estimated to not perform downlink communication.

The base station may transmit a signal and/or channel using the LBT subband(s) variably determined according to the result of performing the LBT operation. The terminal may not know the result of the LBT operation performed by the base station. In order to receive the signal and/or channel transmitted from the base station, the terminal may need to know frequency resources (e.g., LBT subband(s), RB set(s)) used by the base station to transmit the signal and/or channel. The base station may inform the terminal of information of the frequency resources (e.g., information of the LBT subband(s)) used for the downlink communication within the activated BWP.

The base station may configure N LBT subbands (e.g., LBT bandwidths) within one BWP, one carrier, or one cell. Here, N may be an integer equal to or greater than 1. The size of each of the LBT subbands may be Y MHz Here, Y may be 20. Each of the LBT subbands may include K RBs. Here, K may be an integer equal to or greater than 1. The base station may inform the terminal of configuration information of the LBT subbands within the BWP through one or more among higher layer signaling, a MAC CE, and DCI. The LBT subbands within the BWP may be configured according to predefined information (e.g., size). When the size (e.g., width) of the LBT subband within the BWP is configured according to the predefined value, the number of LBT subbands within the BWP may be defined as in Equation 1 below.

$$\text{The number of LBT subbands within the BWP} = \text{(the width of the BWP/the width of the LBT subband)} \quad [\text{Equation 1}]$$

The LBT subbands within the BWP (or carrier, cell) may be configured according to a predefined width of the LBT subband. In this case, the index of the LBT subband may be configured according to a predefined scheme. For example, the indexes of the LBT subbands within the BWP may be configured according to the ascending or descending order of RB indexes within the corresponding BWP. Alternatively, the indexes of the LBT subbands within the BWP may be configured according to the ascending or descending order of frequencies within the corresponding BWP.

The terminal may receive an RRC message (or MAC CE, DCI) including the configuration information of the LBT subbands from the base station, and based on the configuration information included in the RRC message (or MAC CE, DCI), the terminal may identify the positions and width of the LBT subbands within the BWP (or, carrier or cell). In addition, the terminal may identify the number of LBT subbands within the BWP (or carrier, cell) based on the configuration information included in the RRC message. For example, when N LBT subbands are configured within the BWP (or carrier, cell), the base station may transmit an RRC message including N to the terminal. N may be indicated by a specific field included in the configuration information of the BWP or cell RRC configuration information. Alternatively, information indicating the number of LBT subbands may be transmitted through a MAC CE and/or DCI.

When N LBT subbands are configured within the BWP (or carrier, cell), the base station may transmit information (e.g., DL indication information) indicating whether downlink communication is performed in each of the N LBT subbands. The DL indication information may be a bitmap. When the BWP includes N LBT subbands, the size of the bitmap may be N bits. In the exemplary embodiment shown in FIG. 11, the base station may configure four LBT subbands within the BWP. The base station may perform the LBT operation in each of the N subbands. The base station may determine that downlink communication is possible in the LBT subband(s) where the LBT operation is successful. The base station may generate a bitmap (e.g., DL indication information) indicating whether downlink communication is performed in each of the four LBT subbands, and may transmit the generated bitmap to the terminal.

The most significant bit (MSB) of the bitmap may be used for the LBT subband having the lowest RB index within the BWP. The remaining bit(s) of the bitmap may indicate the LBT subband(s) in the ascending order of the RB indexes within the BWP. Alternatively, the MSB of the bitmap may be used for the LBT subband having the largest RB index within the BWP. The remaining bit(s) of the bitmap may indicate the LBT subband (s) in the descending order of the RB indexes within the BWP.

A bit set to '0' within the bitmap may indicate that downlink communication is not performed in the corresponding LBT subband, and a bit set to '1' may indicate that downlink communication is performed in the corresponding LBT subband. The base station may transmit the bitmap (e.g., DL indication information) indicating whether downlink communication is performed in each of the LBT subbands to the terminal. The size of the bitmap may be variable according to the configuration of the LBT subbands within the BWP. The size of the bitmap may be the same as the number of LBT subbands included within the BWP. The size of the bitmap may be indicated by an RRC message. For example, when N LBT subbands are configured within the BWP, the size of the bitmap may be N bits.

The terminal may receive the bitmap from the base station, and identify the LBT subband(s) where downlink communication is performed among the LBT subbands included within the BWP based on the bitmap. The terminal may perform a monitoring operation in the LBT subband(s) where downlink communication is performed, and may not perform a monitoring operation in the LBT subband(s) where downlink communication is not performed. The terminal may receive a signal and/or channel from the base station based on the configuration information of the LBT subbands. When a signal and/or channel are detected, the terminal may estimate the bandwidth of the detected signal and/or channel.

The base station may transmit DCI including configuration information of a downlink communication bandwidth (e.g., LBT subband or RB set used for downlink communication) within the BWP to the terminal. The DCI including the configuration information of the downlink communication bandwidth may be transmitted to a plurality of terminals through a group common control channel (e.g., group common PDCCH). The base station may transmit the DCI including the configuration information of the downlink communication bandwidth to the terminal(s) having the activated BWP.

The base station may configure the group common control channel to indicate the LBT subband(s) where downlink communication is performed among the M LBT subbands within the BWP. The group common control channel may be configured for each LBT subband. In the exemplary embodiment shown in FIG. 12, the base station may configure the group common control channel to indicate the LBT subband(s) where downlink communication is performed among the LBT subbands #1 to #4 within the BWP. The group common control channel may be configured in the LBT subbands #1 and #2. In addition, the base station may configure the group common control channel in the LBT subbands #3 and #4. However, when the LBT operation is unsuccessful in the LBT subbands #3 and #4, the base station may not transmit DCI in the group common control channel configured in the LBT subbands #3 and #4. That is, downlink communication may not be performed in the LBT subbands #3 and #4.

The base station may transmit the information (e.g., DL indication information) indicating the LBT subband(s) where downlink communication is performed through the group common control channel configured in each of the LBT subbands. In the exemplary embodiment shown in FIG. 12, the base station may transmit the DL indication information indicating that downlink communication is performed in the LBT subbands #1 and #2 among the LBT subbands #1 to #4 through the common control channel of the LBT subbands #1 and #2.

Alternatively, the base station may transmit the DL indication information through the group common control channel of the corresponding LBT subband. In the exemplary embodiment illustrated in FIG. 12, the base station may transmit the DL indication information indicating that downlink communication is performed in the LBT subband #1 through the group common control channel of the LBT subband #1, and transmit the DL indication information indicating that downlink communication is performed in the LBT subband #2 through the group common channel of the LBT subband #2. The terminal may receive the DL indication information through the group common control channels of the LBT subbands #1 and #2. In this case, the terminal may receive a signal and/or channel by performing monitoring operations in the LBT subbands #1 and #2. The terminal may not perform monitoring operations in the LBT subbands #3 and #4.

When downlink communication is possible in some LBT subband(s) among the LBT subbands included in the BWP, the base station may transmit a DMRS for a CORESET associated with a common search space through which a resource structure indicator (e.g., DL indication information) is transmitted. Here, a precoderGranurality of the DMRS may be the same as the size of the LBT subband. The base station may transmit configuration information of the LBT subband(s) for downlink communication through the control channel configured in the common search space. The terminal may perform a DMRS detection operation in each of the LBT subbands. The terminal may perform a detection operation of a control channel (e.g., resource structure indicator, DL indication information) in the common search space of the LBT subband in which the DMRS is successfully detected. When the control channel (e.g., resource structure indicator, DL indication information) is successfully detected in the LBT subband, the terminal may determine that downlink communication is performed in the corresponding LBT subband. The terminal may obtain the configuration information of the LBT subband used for downlink communication by detecting the control channel in the LBT subband.

The base station may transmit DCI including resource configuration information of the BWP (e.g., carrier, cell) of the unlicensed band. The DCI may be transmitted through the group common control channel. The DCI may include one or more among channel occupancy time (COT) information, slot configuration information, and frequency resource information of the unlicensed band. The COT indicated by the DCI may be a COT secured by the base station. The slot configuration information may include the positions and numbers of DL slots, flexible (FL) slots, and UL slots. The frequency resource information may include the configuration information of the LBT subband used for downlink communication. The terminal may receive the DCI by detecting the control channel (e.g., group common control channel) in the unlicensed band, and may identify the COT information, slot configuration information, and/or frequency resource information which are included in the DCI. Here, the control channel (e.g., group common control channel) may be located in the common search space.

The terminal may perform a DMRS detection operation or a group common control channel detection operation to estimate the downlink transmission bandwidth of the base station in the unlicensed band. In the exemplary embodiment shown in FIG. 12, the terminal may estimate the LBT subband where downlink communication is performed among the LBT subbands #1 to #4 included in the BWP. The terminal may identify whether downlink communication is performed in the LBT subbands by performing the DMRS detection operation in the LBT subbands. The terminal may perform the group common control channel detection operation in the LBT subband where the DMRS is successfully detected.

The terminal may perform the group common control channel detection operation in each of the LBT subbands. The terminal may identify resource structure information of the LBT subband in which the group common control channel is detected. For example, when the group common control channel is detected, the terminal may identify the position and number of downlink slots and the position and number of uplink slots in the corresponding LBT subband. The terminal may perform a downlink monitoring operation based on the resource structure estimated based on the information obtained through the detected group common control channel.

For example, the terminal may perform a downlink monitoring operation in a downlink symbol and/or a downlink slot indicated by the DCI (e.g., resource structure indicator) obtained through the group common control channel. The terminal may not perform the downlink monitoring operation in an uplink symbol and/or an uplink slot indicated by the DCI (e.g., resource structure indicator) obtained through the group common control channel. The terminal may not perform a DMRS detection operation for estimation of configuration information of the LBT subband in the downlink symbol, the downlink slot, the uplink symbol, and/or the uplink slot indicated by the DCI (e.g., resource structure indicator). The terminal may perform the DMRS detection operation for estimation of configuration information of the LBT subband in time resources after the downlink resources or the uplink resources indicated by the DCI (e.g., resource structure indicator).

In the exemplary embodiment shown in FIG. 12, the terminal may perform the DMRS detection operation for estimation of the configuration information of the LBT subband in the slot #n. The terminal may perform the DMRS detection operation in the LBT subbands #1 to #4 within the activated BWP. The terminal may detect a DMRS in the LBT subbands #1 and #2 of the slot #n, and may not detect a DMRS in the LBT subbands #3 and #4 of the slot #n. The terminal may perform the group common control channel detection operation in the LBT subbands #1 and #2 where the DMRS is detected. That is, the terminal may obtain DCI (e.g., resource structure indicator) through the group common control channel in the LBT subbands #1 and #2 of the slot #n.

The terminal may determine that frequency resources in which downlink communication is performed are the LBT subbands #1 and #2 based on the DCI (e.g., resource structure indicator). In addition, the terminal may determine that time resources where downlink communication is performed are the slots #n to #n+2 based on the DCI (e.g., resource structure indicator). Therefore, the terminal may perform a downlink monitoring operation in the LBT subbands #1 and #2 of the slots #n to #n+2. In addition, the terminal may not perform the DMRS detection operation for estimation of the configuration information of the LBT subband in the LBT subbands #1 and #2 of the slots #n+1 and #n+2.

The terminal may identify whether downlink communication is performed in the corresponding LBT subband by performing the PDCCH DMRS detection operation in the CORESET configured in the LBT subband. In the exemplary embodiment shown in FIG. 12, the terminal may perform the PDCCH DMRS detection operation in the LBT subbands #1 to #4. When the base station transmits a signal and/or channel in the LBT subbands #1 and #2, the terminal may detect a PDCCH DMRS in the LBT subbands #1 and #2. The terminal may not detect a PDCCH DMRS in the LBT subbands #3 and #4. The terminal may determine that downlink communication is performed in the LBT subband(s) where the PDCCH DMRS is detected. The terminal may perform a downlink monitoring operation in the LBT subband(s) where the PDCCH DMRS is detected. The terminal may not perform a downlink monitoring operation in the LBT subband(s) where a PDCCH DMRS is not detected.

For the PDCCH DMRS detection operation for each LBT subband, the base station may configure a PDCCH DMRS in the BWP (e.g., carrier, cell) of the unlicensed band according to predefined information. For example, the PDCCH DMRS configured in the BWP (e.g., carrier, cell) of the unlicensed band may be a wideband PDCCH DMRS. The base station may configure a precoderGranurality including consecutive RBs within the CORESET in the BWP (e.g., carrier, cell) of the unlicensed band. Here, the precoderGranurality may be a precoderGranurality for the CORESET. In this case, the base station may perform a precoding operation for the PDCCH DMRS in the consecutive RBs in the LBT subband based on the precoderGranurality for the CORESET, and may transmit the precoded PDCCH DMRS.

The terminal may determine whether downlink communication is performed in the LBT subband by performing the PDCCH DMRS detection operation. The base station may transmit a PDCCH DMRS having the precoderGranurality equal to the size of the LBT subband in the first symbol. Here, the first symbol may belong to a first slot of a time period (e.g., COT) for downlink communication. The terminal may determine whether downlink communication is performed in the LBT subband by performing the PDCCH DMRS detection operation in the first symbol. When it is determined that downlink communication is performed in the LBT subband, the terminal may perform a monitoring operation for reception of a signal and/or channel in the corresponding LBT subband.

The base station may transmit a PDCCH DMRS in a transmission region corresponding to the common search space within the BWP (e.g., carrier, cell) of the unlicensed band. Here, the PDCCH DMRS may be a wideband PDCCH DMRS, and the common search space may be used for transmission of DCI including a slot structure indicator and/or a burst structure indicator (e.g., COT structure indicator) of the unlicensed band.

When the common search space within the BWP (e.g., carrier, cell) of the unlicensed band is used for transmission of the DCI including the slot structure indicator and/or the burst structure indicator (e.g., COT structure indicator) of the unlicensed band, the precoderGranurality of the CORESET associated with the common search space may be composed of consecutive RBs within the CORESET. The base station may perform the same precoding operation for the PDCCH DMRS in the consecutive RBs in the LBT subband according to the precoderGranurality, and may transmit the precoded PDCCH DMRS. The terminal may determine whether downlink communication is performed in the LBT subband by performing the PDCCH DMRS detection operation. The terminal may perform a monitoring operation on a signal and/or channel in the LBT subband where the PDCCH DMRS is detected. The terminal may not perform the monitoring operation on a signal and/or channel in the LBT subband where the PDCCH DMRS is not detected.

The precoderGranurality of the CORESET associated with the common search space (e.g., the precoderGranurality of the DMRS associated with the CORESET) in the BWP (e.g., carrier, cell) of the unlicensed band may be the same as the size of the LBT subband, and the base station may transmit the corresponding DMRS (e.g., PDCCH DMRS). The common search space may be used for transmission of the DCI including the slot structure indicator and/or the burst structure indicator (e.g., COT structure indicator) of the unlicensed band.

For the first downlink transmission within the COT in the BWP (e.g., carrier) of the unlicensed band, the precoderGranurality of the CORESET associated with the common search space (e.g., the precoderGranurality of the DMRS associated with the CORESET) may be the same as the size of the LBT subband, and the base station may transmit the corresponding DMRS (e.g., PDCCH DMRS). The length of the first downlink transmission within the COT may be the same as one slot. Alternatively, the length of the first downlink transmission within the COT may be shorter than one slot. The common search space may be used for transmission of the DCI including the slot structure indicator and/or the burst structure indicator (e.g., COT structure indicator) of the unlicensed band.

The terminal may perform a detection operation of a DMRS (e.g., PDCCH DMRS) used for downlink communication. The terminal may obtain configuration information (e.g., the number, positions, and sizes) of the LBT subbands where downlink communication is performed by performing the DMRS detection operation. The terminal may perform a downlink monitoring operation in the LBT subband indicated by the obtained configuration information. The terminal may not perform a downlink monitoring operation in the LBT subband(s) that are not indicated by the configuration information of the LBT subbands among all the LBT subbands within the BWP.

The base station may transmit frequency resource information of the BWP, carrier, and/or cell of the unlicensed band to the terminal. For example, the frequency resource information may include information (e.g., number, positions, and sizes) of the LBT subbands. Also, the frequency resource information may include information indicating the LBT subband(s) where downlink communication is not performed. The frequency resource information may be included in DCI, and the DCI may be transmitted through the group common control channel.

The terminal may receive the DCI from the base station by performing a monitoring operation on the group common control channel, and may identify the frequency resource information included in the DCI. The DCI may be received in a common search space or a terminal-specific (i.e., UE-specific) search space. The terminal may identify the LBT subband(s) where downlink communication is performed based on the frequency resource information. In addition, the terminal may identify the LBT subband(s) where downlink communication is not performed based on the frequency resource information.

The base station may perform downlink communication using some LBT subband(s) within the BWP. The terminal may perform a detection operation of a DMRS or a DCI to estimate the LBT subband(s) where downlink communication is performed within the BWP. In the exemplary embodiment shown in FIG. 12, the base station may perform downlink communication using the LBT subbands #1 and #2, which are some LBT subbands within the BWP. The base station may transmit the DMRS in the LBT subbands #1 and #2. The base station may transmit DCI including information (e.g., DL indication information) indicating the LBT subbands #1 and #2 where downlink communication is performed through the LBT subbands #1 and #2. Here, the DCI may be transmitted through the group common control channel.

The terminal may receive the DCI from the base station, and may estimate the LBT subband(s) where downlink communication is performed among the LBT subbands #1 to #4 based on the information included in the DCI. For example, the terminal may determine whether downlink communication is performed in the LBT subbands by performing a detection operation of a DMRS (e.g., PDCCH DMRS) in the LBT subbands. The terminal may determine that downlink communication is performed in the LBT subband where the DMRS is detected.

The terminal may perform a DCI detection operation to obtain the information (e.g., DL indication information) indicating the LBT subband where downlink communication is performed. The DCI detection operation may be performed on the group common control channel. The terminal may receive the DCI in the common search space or the UE-specific search space. For example, the terminal may perform the DCI detection operation in the LBT subband where the PDCCH DMRS is detected, and determine whether downlink communication is performed in the LBT subband based on the information included in the DCI. The terminal may perform a downlink monitoring operation in the LBT subband where downlink communication is performed. The terminal may not perform a downlink monitoring operation in the LBT subband where downlink communication is not performed.

CSI-RS resources may be configured in a plurality of LBT subbands. The base station may transmit configuration information of the CSI-RS configured in the plurality of LBT subbands to the terminal through one or more among higher layer signaling, a MAC CE, and DCI. The terminal may receive the CSI-RS configuration information from the base station, and may determine that CSI-RS resources are configured in the plurality of LBT subbands based on the CSI-RS configuration information.

In this case, when it is determined that downlink communication is performed in all the LBT subbands where the CSI-RS resources are configured, the terminal may determine that the CSI-RS is transmitted in all the LBT subbands (e.g., the plurality of LBT subbands indicated by the base station). When downlink communication is not performed in one or more LBT subbands among all the LBT subbands where the CSI-RS resources are configured, the terminal may determine that CSI-RS is not transmitted. Here, the terminal may determine that the CSI-RS is not transmitted in all the LBT subbands where CSI-RS is configured or the one or more LBT subbands where downlink communication is not performed. In this case, the terminal may not perform a measurement operation of the CSI-RS and a reporting operation of CSI.

The base station may transmit COT configuration information through a control channel (e.g., group common control channel). Alternatively, the COT configuration information may be transmitted through higher layer signaling and/or a MAC CE. The COT configuration information may include one or more among time resource information of the COT, frequency resource information of the COT, LBT priority class information used by the base station to configure the COT, and the type of LBT operation used by the terminal to perform communication within the COT. The terminal may receive the COT configuration information through the higher layer signaling, MAC CE, or DCI. For example, the terminal may receive the COT configuration information through the group common control channel. The terminal may perform a downlink monitoring operation and/or an uplink transmission operation within the COT based on the COT configuration information.

The base station may secure the COT by performing the LBT operation. The configuration of the COT may vary depending on the type of LBT operation performed by the base station (e.g., LBT categories 1 to 4). For example, the maximum length of the COT may vary depending on the type of LBT operation performed by the base station. The type of LBT operation performed by the base station may vary depending on the priority class of data to be transmitted within the COT. The base station may perform the LBT operation using different LBT parameters to secure the COT corresponding to each priority class. When the LBT operation is performed according to a priority class, parameters for determining the execution time of the LBT operation may be different. In an LBT operation involving a random backoff procedure, the minimum and/or maximum size of a contention window for deriving a random backoff counter may be configured differently according to each priority class.

The base station may secure the COT by performing the LBT operation based on the above-described method, and may transmit configuration information of the secured COT to the terminal. The COT configuration information may include the LBT parameters used by the base station to perform the LBT operation. For example, the LBT parameters may include information of the priority class. The terminal may receive the COT configuration information from the base station, and may identify the LBT parameters used for securing the COT based on the COT configuration information.

The base station may transmit the configuration information of the COT secured through the LBT operation to the terminal. The COT configuration information may include one or more among the starting time point of the COT, the time length of the COT, and the ending time point of the COT. The time length of the COT may be a length from the transmission time point of the group common control channel including the COT configuration information to the ending time point of the COT. For example, when the COT is configured from a time point t to a time point t+n and the COT configuration information is transmitted at a time point t+k before the time point t+n, the time length of the COT may indicate n-k. The terminal may receive the COT configuration information from the base station, and determine whether a downlink communication period and/or an uplink communication period are included in the COT based on the COT configuration information.

Further, the COT configuration information may include one or more among burst signal configuration information, information indicating a format of a slot, symbol, or period within the COT, and configuration information of PDCCHs within the COT (e.g., configuration information of PDCCH occasions). The COT configuration information may be transmitted through one or more among higher layer signaling, a MAC CE, and DCI. For example, the terminal may receive the COT configuration information through the group common control channel, and may perform a monitoring operation on the PDCCH occasion indicated by the COT configuration information.

The information indicating a slot format may indicate that a slot included in the COT is a DL slot, an FL slot, or a UL slot. The information indicating a symbol format may indicate that a symbol included in the COT is a DL symbol, an FL symbol, or a UL symbol. The information indicating a period format may indicate that a time period in the COT is a DL period, an FL period, or a UL period. The terminal may perform a PDCCH monitoring operation in the DL slot, FL slot, DL symbol, FL symbol, DL period, and/or FL period within the COT. The PDCCH monitoring operation may not be performed in the UL slot, UL symbol, and UL period.

The information indicating whether downlink communication is performed in the LBT subband (e.g., DL indication information) may be included in frequency domain configuration information (e.g., frequency resource information) of the COT. The base station may perform the LBT operation in each of the LBT subbands, and secure the COT in the LBT subband(s) where the LBT operation is successful. The frequency resources of the COT may be configured according to the LBT subband(s) where the LBT operation is successful. The frequency resource information and time resource information of the COT may be transmitted through the group common control channel (e.g., the same group common control channel). The frequency resource information and time resource information of the COT may be included in the same DCI. The DCI may include a field indicating the frequency resource information of the COT and a field indicating the time resource information of the COT. The frequency resource information of the COT may be jointly encoded with the time resource information of the COT in the same DCI. Ln this case, the frequency resource information and time resource information of the COT may be indicated by one field included in DCI.

The terminal may receive the frequency resource information of the COT from the base station, and may identify the frequency resources of the COT based on the frequency resource information. The terminal may receive the time resource information of the COT from the base station, and may identify the time resources of the COT based on the time resource information. The terminal may perform a downlink monitoring operation in the radio resources (e.g., time and frequency resources) configured as the COT. The terminal may not perform a downlink monitoring operation in radio resources (e.g., time and frequency resources) that are not configured as the COT.

The base station may transmit the information indicating the LBT subband(s) where downlink communication is performed or the LBT subband(s) belonging to the COT secured by the base station to the terminal. In addition, the base station may transmit the time resource information of the COT secured by the base station to the terminal. The LBT subband(s) where downlink communication is performed or the LBT subband(s) belonging to the COT secured by the base station may be valid within the time resources (e.g., time period) of the COT.

For example, the base station may transmit information indicating the LBT subband #n where downlink communication is performed or the LBT subband #n belonging to the COT secured by the base station to the terminal, and transmit time resource information of the COT secured by the base station to the terminal. The terminal may determine that the LBT subband #n is valid within the time period of the COT based on the information received from the base station. After the time period of the COT ends, the terminal may determine that the LBT subband #n is invalid.

The configuration information of the LBT subband(s) where downlink communication is performed within the COT may be different from the configuration information of the LBT subband(s) where downlink communication is performed outside the COT. The configuration information of the LBT subband(s) where downlink communication is performed within a time period of a downlink burst may be different from the configuration information of the LBT subband(s) where downlink communication is performed outside the time period of the downlink burst.

The configuration information of the LBT subband(s) where downlink communication is performed within the COT or the time period of the downlink burst may include the information indicating whether downlink communication is performed in the LBT subband(s) (e.g., DL indication information). For example, the DL indication information indicating whether downlink communication is performed in the LBT subband #n may be transmitted through the LBT subband #n. The DL indication information transmitted through the LBT subband #n may not include information indicating whether downlink communication is performed in another LBT subband. The information indicating whether downlink communication is performed in another LBT subband may be meaningless information. The terminal may ignore the information indicating whether downlink communication is performed in another LBT subband.

In the exemplary embodiment shown in FIG. 12, the base station may transmit the DL indication information indicating whether downlink communication is performed in the LBT subband to the terminal through the slot #n to which the starting time point of the COT or the downlink burst belongs. The DL indication information transmitted through the LBT subband #1 of the slot #n may indicate whether downlink communication is performed in the LBT subband #1. The size of the DL indication information may be 1 bit. The DL indication information transmitted through the LBT subband #1 of the slot #n may not include information indicating whether downlink communication is performed in LBT subband(s) other than the LBT subband #1.

The terminal may determine whether downlink communication is performed in the LBT subband #1 based on the DL indication information received from the base station. The terminal may receive DL indication information in each of the LBT subbands to determine whether downlink communication is performed in each of the LBT subbands. The base station may independently transmit the DL indication information in a time period (e.g., slot) to which the starting time point of the COT or the downlink burst belongs. The terminal may identify frequency resources (e.g., LBT subband(s)) where downlink communication is performed within the BWP based on the DL indication information.

The DL indication information may be a bitmap. In this case, the base station may transmit the bitmap indicating whether downlink communication is performed in each of the LBT subbands in a time period (e.g., slot) to which the starting time point of the COT or the downlink burst belongs. In the exemplary embodiment illustrated in FIG. 12, a bit (e.g., bit included in the bitmap) indicating whether downlink communication is performed in the LBT subband #1 may be transmitted through the LBT subband #1 of the slot #n.

The terminal may receive the DL indication information in the time period (e.g., slot) to which the starting time point of the COT or the downlink burst belongs. The terminal may identify frequency resources (e.g., LBT subband(s)) where downlink communication is performed within the BWP using all the DL indication information received in the LBT subbands.

The base station may transmit the DL indication information (e.g., bit) for each LBT subband. In the exemplary embodiment shown in FIG. 12, when the LBT operation is successful in the LBT subbands #1 and #2, the base station may transmit the DL indication information (e.g., information having the size of 1 bit) indicating that downlink communication is performed in the LBT subband #1 through the LBT subband #1, and transmit the DL indication information (e.g., information having the size of 1 bit) indicating that downlink communication is performed in the LBT subband #2 through the LBT subband #2. The information set to '0' may indicate that downlink communication is performed in the corresponding LBT subband. Alternatively, the information set to '1' may indicate that downlink communication is performed in the corresponding LBT subband.

The LBT operation in the LBT subbands #3 and #4 may fail. In this case, downlink communication may not be performed in the LBT subbands #3 and #4. The base station may not transmit DL indication information indicating that downlink communication is not performed through the LBT subbands #3 and #4. The terminal may determine that downlink communication is performed in the LBT subbands #1 and #2 within the BWP based on the information received from the base station. Further, the terminal may determine that downlink communication is not performed in the subbands #3 and #4 within the BWP When the BWP includes N LBT subbands, the base station may configure a bitmap (e.g., DL indication information) including N bits to indicate whether downlink communication is performed in the N LBT subbands. Each of the N bits included in the bitmap may correspond to each of the N LBT subbands included in the BWP. In the exemplary embodiment shown in FIG. 12, the BWP may include four LBT subbands, and the base station may configure a bitmap including four bits to indicate whether downlink communication is performed in the four LBT subbands.

The base station may transmit a bitmap indicating whether downlink communication is performed in the LBT subband #m through the LBT subband #m in a time period (e.g., slot #n) to which the starting time point of the COT or the downlink burst belongs. Each of n and m may be an integer equal to or greater than 0. The bitmap transmitted through the LBT subband #m of the slot #n may not include information indicating whether downlink communication is performed in the remaining LBT subbands other than the LBT subband #m among the LBT subbands included in the BWP.

In the exemplary embodiment shown in FIG. 12, the DL indication information may be transmitted in each of the LBT subbands of the slot #n to which the starting time point of the COT or the downlink burst belongs. The DL indication information (e.g., bitmap) transmitted through the LBT subband #m of the slot #n may include information indicating whether downlink communication is performed in the LBT subband #m and information of LBT subband(s) other than the LBT subband #m. The information of the LBT subband(s) other than the LBT subband #m may be configured as a preset value (e.g., '0' or '1'). Among the bits included in the bitmap (e.g., DL indication information), bit(s) corresponding to the LBT subband(s) other than the LBT subband #m may be configured as the preset value (e.g., '0' or '1').

When the BWP includes four LBT subbands, the size of the bitmap indicating whether downlink communication is performed in each of the LBT subbands may be four bits. In the bitmap, the first bit may indicate whether downlink communication is performed in the LBT subband #1, the second bit may indicate whether downlink communication is performed in the LBT subband #2, the third bit may indicate whether downlink communication is performed in the LBT subband #3, and the fourth bit may indicate whether downlink communication is performed in the LBT subband #4.

The bitmap transmitted through the LBT subband #1 of the slot #n may be set to '1000'. The bitmap set to '1000' may indicate that downlink communication is performed in the LBT subband #1. Among the bits included in the bitmap, bits corresponding to the LBT subbands other than the LBT subband #1 may be set to '0'. The bitmap transmitted through the LBT subband #2 of the slot #n may be set to '0100'. The bitmap set to '0100' may indicate that downlink communication is performed in the LBT subband #2. Among the bits included in the bitmap, bits corresponding to the LBT subbands other than the LBT subband #2 may be set to '0'.

The terminal may receive the bitmap in each of the LBT subbands of the slot #n, and identify whether downlink communication is performed in each of the LBT subbands based on the bitmap. The terminal may identify the LBT subbands where downlink communication is performed within the BWP by combining the bitmaps received in the respective LBT subbands. For example, the terminal may receive the bitmap set to '1000' in the LBT subband #1, and the bitmap set to '0100' in the LBT subband #2. The terminal may determine that downlink communication is performed in the LBT subbands #1 and #2 within the BWP by combining the bitmap received in the LBT subband #1 and the bitmap received in the LBT subband #2. The terminal may perform an OR operation on the bitmap received in the LBT subband #1 and the bitmap received in the LBT subband #2. For example, the terminal may derive '1100' by performing an operation ('1000' OR '0100'), and may determine that downlink communication is performed in the LBT subbands #1 and #2 within the BWP based on '1100'.

When the BWP includes N LBT subbands, the terminal may receive m bitmap(s) in m LBT subband(s) among the N LBT subbands, m may be a natural number equal to or less than N. The terminal may perform an OR operation on the m bitmap(s), and identify the LBT subband(s) where downlink communication is performed within the BWP based on the result of the OR operation.

The bitmap transmitted through the slot #n to which the starting time point of the COT or the downlink burst belongs may be configured as a predefined value. The predefined value may not indicate whether downlink communication is performed in the LBT subband. The terminal may perform the downlink monitoring operation regardless of the bitmap received in the slot #n to which the starting time point of the COT or the downlink burst belongs. The downlink monitoring operation may be performed on the configured LBT subbands regardless of the bitmap received in the slot #n to which the starting time point of the COT or the downlink burst belongs.

The DL indication information may be transmitted in a time period other than the time period to which the starting time point of the COT or the downlink burst belongs. Ln this case, the DL indication information may indicate whether downlink communication is performed in other LBT subband(s) as well as the LBT subband where DL indication information is transmitted. The terminal may receive the DL indication information, and identify whether downlink communication is performed in each of the LBT subbands within the BWP based on the DL indication information.

In the exemplary embodiment shown in FIG. 12, the base station may transmit the DL indication information to the terminal in the slot #n+2 to which the starting time point of the COT or the downlink burst does not belong. The DL indication information transmitted in the slot #n+2 may indicate whether downlink communication is performed in each of the LBT subbands #1 to #4. The DL indication information transmitted through the LBT subband #1 of the slot #n+2 may indicate whether downlink communication is performed in the LBT subbands #2 to #4 as well as the LBT subband #1. The DL indication information transmitted through the LBT subband #1 of the slot #n+2 may include a bit indicating whether downlink communication is performed in the LBT subband #1 and bits indicating whether downlink communication is performed in the LBT subbands #2 to #4. The bit indicating whether downlink communication is performed in the LBT subband #1 and the bits indicating whether downlink communication is performed in the LBT subbands #2 to #4 may be located in the same field (e.g., the same field included in DCI).

The terminal may obtain the DL indication information (e.g., the field included in DCI) from the base station, and identify whether downlink communication is performed in the LBT subband #1 based on the DL indication information. In addition, the terminal may identify whether downlink communication is performed in each of the LBT subbands #2 to #4 based on the DL indication information. The terminal may identify whether downlink communication is performed in all the LBT subbands belonging to the BWP based on the DL indication information received from one or more LBT subbands within the BWP.

The terminal may estimate that the DL indication information received through the LBT subbands within the BWP are the same as each other. For example, the terminal may estimate that the DL indication information received in the LBT subband #n is the same as the DL indication information received in the LBT subband #m. When the DL indication information received in the LBT subband #n is not the same as the DL indication information received in the LBT subband #m, the terminal may ignore the DL indication information. In this case, the terminal may perform a downlink monitoring operation in the LBT subband indicated by the corresponding DL indication information as an LBT subband where downlink communication is not performed. The terminal may combine the DL indication information received in the respective LBT subbands within the BWP, and may identify whether downlink communication is performed in the LBT subbands within the BWP based on the combined DL indication information. In order to identify whether downlink communication is performed in the LBT subbands within the BWP, the terminal may perform an OR operation on the DL indication information (e.g., bitmaps) received in the LBT subbands within the BWP.

The bitmap (e.g., DL indication information) transmitted through the LBT subband #m of the slot #n+2 other than the time period to which the starting time point of the COT or the downlink burst belongs may indicate whether downlink communication is performed in the LBT subband #m. In addition, the bitmap (e.g., DL indication information) transmitted through the LBT subband #m of the slot #n+2 may indicate whether downlink communication is performed in other LBT subband(s) except the LBT subband #m. The bitmap (e.g., DL indication information) may be included in DCI.

The bitmap (e.g., DL indication information) may be indicated by the same field in DCI (e.g., different bits constituting the same field). The terminal may receive the DCI from the base station, may identify the bitmap (e.g., DL indication information) included in the DCI, and may identify whether downlink communication is performed in the LBT subbands within the BWP based on the bitmap (e.g., DL indication information). The DL indication information (e.g., bitmap) transmitted through each of the LBT subbands of the slot #n+2 other than the time period to which the starting time point of the COT or the downlink burst belongs may indicate whether downlink communication is performed in the corresponding LBT subband.

In the exemplary embodiment shown in FIG. 12, when the BWP includes four LBT subbands, the size of the bitmap indicating whether downlink communication is performed in the four LBT subbands may be four bits. Each of the four bits included in the bitmap may correspond to each of the LBT subbands #1 to #4. The base station may transmit the bitmap set to '1100' through the LBT subband #1 of the slot #n+2, and transmit the bitmap set to '1100' through the LBT subband #2 of the slot #n+2. The bitmap transmitted in the LBT subband #1 of the slot #n+2 may be the same as the bitmap transmitted in the LBT subband #2 of the slot #n+2.

The terminal may receive the bitmap (e.g., DL indication information) in each of the LBT subbands, and identify whether downlink communication is performed in the LBT subbands within the BWP based on the bitmap. The terminal may receive the bitmap set to '1100' in the LBT subband #1, and determine that downlink communication is performed in the LBT subbands #1 and #2 based on the bitmap. The terminal may receive the bitmap set to '1100' in the LBT subband #2, and determine that downlink communication is performed in the LBT subbands #1 and #2 based on the bitmap.

The terminal may combine the DL indication information (e.g., bitmaps) received through the LBT subbands within the BWP, and may identify whether downlink communication is performed in the LBT subbands within the BWP based on the combined DL indication information. For example, the terminal may perform an OR operation on the bitmaps received in the LBT subbands. When the BWP includes m LBT subbands, the terminal may receive bitmaps (e.g., DL indication information) through a plurality of LBT subbands among the m LBT subbands, may perform an OR operation on the received maps, and may identify whether downlink communication is performed in the m LBT subbands based on the result of the OR operation.

In the exemplary embodiment shown in FIG. 12, when the bitmap received through the LBT subband #1 is '1000' and the bitmap received through the LBT subband #2 is '0100', the terminal may derive '1100' by performing an operation ('0100' OR '1000'). The terminal may determine that downlink communication is performed in the LBT subbands #1 and #2 based on '1100'.

The terminal may estimate that the DL indication information received through the LBT subbands are the same. When the DL indication information received through the LBT subbands are different, the terminal may ignore the corresponding DL indication information. When the DL indication information (e.g., bitmaps) received through the LBT subbands are different, the terminal may perform an OR operation on the corresponding bitmaps, and may identify whether downlink communication is performed in the LBT subbands within the BWP based on the result of the OR operation. The terminal may perform a downlink monitoring operation in the LBT subband(s) determined as LBT subband(s) where downlink communication is performed. Also, the terminal may not perform a downlink monitoring operation in the LBT subband(s) determined as LBT subband(s) where downlink communication is not performed.

The DL indication information transmitted in the time period (e.g., slot) to which the starting time point of the COT or downlink burst does not belong may indicate whether downlink communication is performed in LBT subband(s) other than the LBT subband where the corresponding DL indication information is transmitted. For example, the DL indication information may include information indicating whether downlink communication is performed in the LBT subband where the DL indication information is transmitted and/or information indicating whether downlink communication is performed in the LBT subband(s) other than the LBT subband where the DL information is transmitted. The terminal may identify whether downlink communication is performed in each of the LBT subbands within the BWP based on the DL indication information received from the base station.

The BWP may include m LBT subbands. In this case, the base station may transmit DL indication information (e.g., bitmap) indicating whether downlink communication is performed in the m LBT subbands to the terminal through one or more LBT subbands among the m LBT subbands. The DL indication information may be transmitted through one or more predefined LBT subbands among the m LBT subbands. The base station may transmit the DL indication information to the terminal through the LBT subband having the lowest index among the LBT subbands where downlink communication is performed within the BWP. Alternatively, the base station may transmit the DL indication information to the terminal through the LBT subband having the highest index among the LBT subbands where downlink communication is performed within the BWP. The terminal may receive the DL indication information in the LBT subband, and identify the LBT subband(s) where downlink communication is performed within the BWP based on the DL indication information.

The base station may transmit to the terminal the DL indication information (e.g., bitmap) indicating whether downlink communication is performed in the m LBT subbands included in the BWP through one or more predefined LBT subbands among the m LBT subbands. The one or more LBT subbands used for transmission of the DL indication information may be indicated by DCI. The terminal may receive the DL indication information through the one or more LBT subbands indicated by the DCI received from the base station, and identify the LBT subband(s) where downlink communication is performed within the BWP based on the DL indication information.

In the exemplary embodiment shown in FIG. 12, the base station may transmit the DL indication information to the terminal through the slot #n+2 to which the starting time point of the COT or downlink burst does not belong. The DL indication information may indicate whether downlink communication is performed in each of the LBT subbands. The DL indication information transmitted through the LBT subbands #1 and/or #2 of the slot #n+2 may indicate whether downlink communication is performed in the LBT subbands #1 and #2. Alternatively, the DL indication information transmitted through the LBT subbands #1 and/or #2 of the slot #n+2 may indicate whether downlink communication is performed in the LBT subbands #1 to #4. The DL indication information (e.g., bitmap) may be configured as one field (e.g., the same field) in the DCI.

The terminal may identify whether downlink communication is performed in all LBT subbands included in the BWP based on the DL indication information received through one or more LBT subbands within the BWP. The terminal may identify the LBT subband(s) where downlink communication is not performed based on the DL indication information, and may not perform a downlink monitoring operation in the identified LBT subband(s).

The base station may periodically transmit the DL indication information (e.g., bitmap). The DL indication information (e.g., bitmap) may be periodically transmitted through DCI. The DL indication information may be periodically transmitted within the COT. The terminal may periodically perform a monitoring operation in order to receive the DL indication information within the COT configured by the base station. The base station may inform the terminal of configuration information (e.g., monitoring periodicity, monitoring interval) of the monitoring operation. The terminal may periodically perform a monitoring operation for DCI including the DL indication information according to the configuration information of the monitoring operation received from the base station. The terminal may receive the DL indication information from the base station, and identify whether downlink communication is performed in the LBT subbands within the BWP based on the DL indication information.

The terminal may perform a downlink monitoring operation in the LBT subband(s) identified as LBT subband(s) where downlink communication is performed, and may not perform a downlink monitoring operation in the LBT subband(s) identified as LBT subband(s) where downlink communication is not performed.

Meanwhile, in the exemplary embodiment shown in FIG. 12, the terminal may perform a detection operation of DMRS (e.g., PDCCH DMRS) for estimation of the BWP (e.g., LBT subband) in the slot #n. The terminal may perform the DMRS detection operation in the LBT subbands #1 to #4 within the activated BWP. The terminal may detect DMRS in the LBT subbands #1 and #2 of the slot #n, and may not detect DMRS in the LBT subbands #3 and #4 of the slot #n. The terminal may perform a detection operation of a group common control channel in the LBT subbands #1 and #2 where the DMRS is successfully detected. Here, the group common control channel may include resource allocation information (e.g., resource structure indicator).

The terminal may obtain resource allocation information from the group common control channel, and may determine that the LBT subbands #1 and #2 are used for downlink communication in the frequency axis based on the resource allocation information, and may determine that the slots #n to #n+2 are used for downlink communication in the time axis based on the resource allocation information. Therefore, the terminal may perform a downlink monitoring operation in the LBT subbands #1 and #2 of the slots #n to #n+2. Alternatively, the terminal may not perform a detection operation of DMRS for estimation of the BWP (e.g., LBT subband) in the slots #n+1 to #n+2.

The base station may configure one or more LBT subbands among the plurality of LBT subbands within the BWP as a primary LBT subband. The base station may transmit configuration information of the primary LBT subband to the terminal using one or more among higher layer signaling, a MAC CE, and DCI. The primary LBT subband may be predefined. A group common control channel may be configured in the primary LBT subband.

Figure 13:
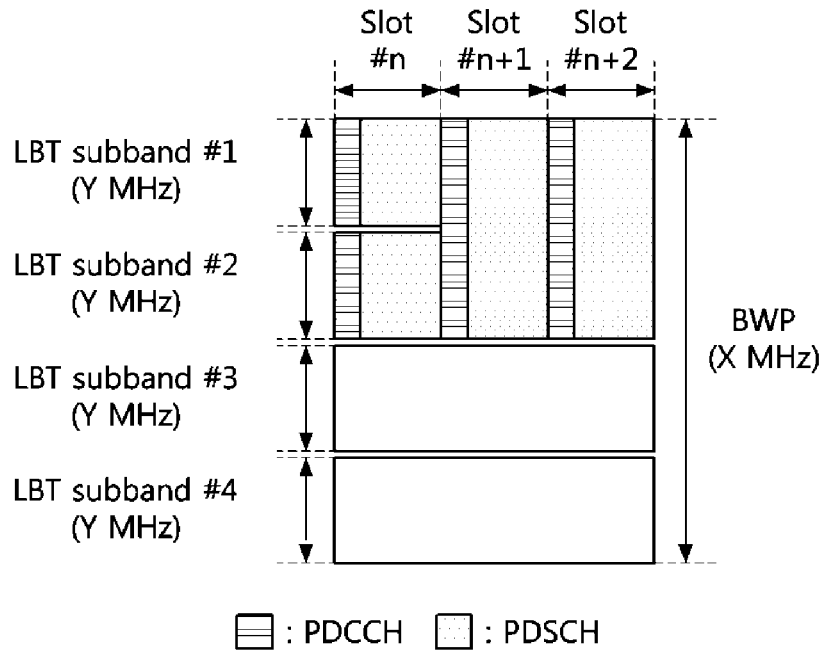
FIG. 13 is a conceptual diagram illustrating a second exemplary embodiment of a communication method using an LBT subband in a communication system.

FIG. 13 is a conceptual diagram illustrating a second exemplary embodiment of a communication method using an LBT subband in a communication system.

Referring to FIG. 13, the BWP may include four LBT subbands. The width of the BWP may be X MHz, and the width of each of the LBT subbands may be Y MHz. Among the four LBT subbands, one or more LBT subbands may be configured as a primary LBT subband. The primary LBT subband may be predefined. The base station may transmit DL indication information indicating whether downlink communication is performed in the primary LBT subband to the terminal. When the primary LBT subband is the LBT subband #1, the base station may transmit DL indication information through the LBT subband #1. A group common control channel may be configured in the LBT subband #1 (i.e., primary LBT subband). The base station may transmit downlink transmission bandwidth information to the terminal through the group common control channel of the LBT subband #1 (i.e., primary LBT subband).

When the base station performs downlink communication in the LBT subbands #1 and #2, the DL indication information transmitted through the LBT subband #1 (e.g., primary LBT subband) may indicate whether downlink communication is performed in the LBT subbands #1 and #2. The base station may transmit downlink transmission bandwidth information to the terminal using a group common control channel. The terminal may obtain the downlink bandwidth information through the LBT subband #1 (e.g., primary LBT subband). The terminal may perform a downlink monitoring operation in the LBT subband #1 (e.g., primary LBT subband) within the BWP. The terminal may perform a DMRS detection operation in order to detect a downlink signal and/or channel in the LBT subband #1. The terminal may perform a group common control channel detection operation in the LBT subband #1. The terminal may perform demodulation and decoding operations on the group common control channel of the LBT subband #1, thereby identifying frequency resources (e.g., LBT subband(s)) where downlink communication is performed within the BWP.

In the following exemplary embodiments, methods for detecting a PDCCH in LBT subbands when the LBT subbands within the BWP, carrier, or cell are variably configured will be described. The base station may configure the size of the frequency resources of the CORESET within the BWP (or carrier, cell) of the unlicensed band to be the same as the width of the BWP (or carrier, cell). In the exemplary embodiment shown in FIG. 13, when the width of the BWP is X MHz, the size of CORESET in the frequency axis may be configured to be X MHz. The CORESET may be configured in a frequency region excluding guard bands between the LBT subbands within the BWP.

The base station may perform downlink communication in the LBT subbands #1 and #2 according to the result of performing the LBT operation, and may not perform downlink communication in the LBT subbands #3 and #4. The base station may configure a control channel and a data channel based on the LBT subband(s) where downlink communication is performed, and may perform downlink communication using the control channel and the data channel. The control channel and data channel may be configured regardless of the CORESET configured through higher layer signaling.

The size of the CORESET in the frequency axis may be the same as the width of the BWP. Alternatively, the frequency resources of the CORESET may be frequency resources excluding guard bands (e.g., intra-carrier guard bands) between the LBT subbands within the BWP. In this case, downlink communication may be performed in some LBT subband(s) within the BWP. The frequency resources of the CORESET may be limited to frequency resources where downlink communication is performed, and downlink communication may be performed based on the corresponding CORESET.

The frequency domain configuration information of the CORESET may be indicated by a bitmap. One of bits included in the bitmap may indicate N RBs in the frequency domain. N may be an integer equal to or greater than 1. The CORESET may be configured in frequency resources indicated by the bitmap. The first bit of the bitmap may indicate N RBs. The N RBs indicated by the first bit of the bitmap may be the starting RB of the BWP and (N−1) RBs consecutive with the starting RB. The starting RB may be a starting common resource block (CRB). The order of RBs indicated by the bits of the bitmap may be in ascending or descending order. For example, the first bit of the bitmap may indicate the RB #0 to the RB #N−1, and the second bit of the bitmap may indicate the RB #N to the RB #2N−1. The base station may transmit the frequency domain configuration information of the CORESET (e.g., information indicating frequency resources where the CORESET is configured) to the terminal. The terminal may receive the configuration information of the CORESET from the base station, and may identify the frequency resources of the CORESET based on the received configuration information.

The base station may configure an offset indicating the frequency resources of the CORESET. For example, the base station may configure an arbitrary value from 0 to N−1 as the offset. N may be an integer equal to or greater than 1. The offset may be an offset for mapping between the bitmap indicating the frequency domain configuration information of the CORESET and the RB indexes within the BWP. When the offset is K and the M-th bit of the bitmap indicates RB #(M−1)×N to RB #M×N, the CORESET may be mapped to the RB #(M−1)×N+K to the RB #M×N+K in the frequency domain. Each of K and M may be an integer equal to or greater than 1, and N may be the number of RBs indicated by one bit of the bitmap.

The size of the CORESET in the frequency domain may be the same as the width of BWP. Alternatively, the size of CORESET in the frequency domain may be the same as the size of the frequency resources excluding the guard bands between the LBT subbands within the BWP. Downlink communication may be performed through some LBT subband(s) within the BWP. The terminal may identify the LBT subband(s) where downlink communication is performed by performing a detection operation on a DMRS (e.g., PDCCH DMRS) or a downlink control channel. The terminal may determine that the frequency resources of the CORESET are the same as the frequency resources where downlink communication is performed. The terminal may identify the frequency resources (e.g., LBT subbands) where downlink communication is performed based on the above-described method, and may perform a downlink monitoring operation on the identified frequency resources.

In the exemplary embodiment shown in FIG. 13, the terminal may determine that downlink communication is performed in the LBT subbands #1 and #2 by performing the DMRS detection operation. Alternatively, the terminal may determine that the downlink communication is performed in the LBT subbands #1 and #2 based on information (e.g., DL indication information) received from the base station. The terminal may interpret that the frequency resources of the CORESET are limited to the LBT subbands #1 and #2. Therefore, the terminal may perform the PDCCH monitoring operation in the LBT subbands #1 and #2.

The frequency resources of the CORESET may be interpreted differently depending on a slot position. The base station and the terminal may interpret that the frequency resources of the CORESET are equal to one LBT subband in the first slot of the COT or downlink burst. The base station and the terminal may interpret that the frequency resources of the CORESET are equal to the frequency resources where downlink communication is performed in the slot(s) other than the first slot of the COT or downlink burst.

In the exemplary embodiment shown in FIG. 13, the base station and the terminal may interpret that the width of the CORESET in the slot #n is equal to the width of the LBT subband. Therefore, the base station may transmit a PDCCH, and may transmit a PDSCH scheduled by the PDCCH for each LBT subband. The terminal may receive the PDCCH by performing the PDCCH monitoring operation for each LBT subband, and may receive the PDSCH scheduled by the PDCCH from the base station.

The base station and the terminal may interpret that the frequency resources of the CORESET in the slots #n+1 and #n+2 except the slot #n are equal to the frequency resources (e.g., LBT subbands #1 and #2) in which downlink communication is performed. The base station may configure the PDCCH in all of the LBT subbands #1 and #2. That is, the base station may transmit the PDCCH in the LBT subbands #1 and #2, and may transmit the PDSCH scheduled by the PDCCH. The terminal may receive the PDCCH by performing the PDCCH monitoring operation in all of the LBT subbands #1 and #2, and may receive the PDSCH scheduled by the PDCCH from the base station.

The guard band between the LBT subbands in the first slot of the COT or downlink burst may not be used for a PDCCH and/or a PDSCH. The guard bands between LBT the subbands in slot(s) other than the first slot of the COT or downlink burst may be used for a PDCCH and/or a PDSCH. The guard bands may not exist in the remaining slot(s) except the first slot of the COT or downlink burst.

Communication between the base station and the terminal may be performed using a variable frequency band within the BWP. In this case, the base station may configure a CORESET having the same size as the LBT subband in the terminal using higher layer signaling. The base station and the terminal may interpret that the CORESET is repeated in the frequency domain in the BWP, carrier, or cell of the unlicensed band. In the exemplary embodiment shown in FIG. 13, the base station may configure a CORESET having the same size as the LBT subband #1 in the terminal using higher layer signaling. The base station and the terminal may interpret that the CORESET configured by higher layer signaling is repeated in the LBT subbands #1 to #4 within the BWP. The base station and the terminal may interpret that the same CORESET is configured in each of the LBT subbands #1 to #4 within the BWP. The base station may configure a PDCCH in each of the LBT subbands and may perform downlink communication according to a result of performing an LBT operation. The terminal may receive a downlink signal and/or channel by performing a downlink monitoring operation in each of the LBT subbands.

The base station may configure a CORESET having the size equal to or smaller than the LBT subband in the terminal using higher layer signaling. The base station may configure a search space associated with the CORESET. A PDCCH occasion where the search space is located may be repeated for each LBT subband. For example, there may be multiple PDCCH occasions in the frequency axis. The base station may transmit configuration information of the search space to the terminal using higher layer signaling. The configuration information of the search space may include an ID of the CORESET associated with the search space, information indicating LBT subband(s) in which monitoring operation for the search space is performed, and the like.

The base station may configure a CORESET X. The size of the CORESET X in the frequency domain may be less than or equal to the size of the LBT subband. The base station may configure a search space Y associated with the CORESET X. Configuration information of the search space Y may include the ID of the CORESET X associated with the search space Y. In addition, the configuration information of the search space Y may further include information indicating LBT subband(s) where a PDCCH monitoring operation according to the characteristics of the CORESET X and the search space Y is performed. The PDCCH monitoring operation may be performed in one or more LBT subbands. The information indicating the LBT subband(s) where the PDCCH monitoring operation is performed may be index(es) of the corresponding LBT subband(s). Alternatively, the information indicating the LBT subband(s) where the PDCCH monitoring operation is performed may be a bitmap. The LBT subband(s) where the PDCCH monitoring operation is performed may be LBT subband(s) configured in the BWP, carrier, or cell.

The terminal may perform the PDCCH monitoring operation using the configuration information of the CORESET and the search space. The terminal may perform the PDCCH monitoring operation in the LBT subband(s) indicated by the base station. In the PDCCH monitoring procedure, the characteristics of the CORESET may be the same in LBT subband(s) except the frequency resources where the PDCCH monitoring operation is performed. In the PDCCH monitoring procedure, the characteristics of the search space may be the same in the LBT subband(s).

The configuration of the downlink signal and/or channel may be changed according to the result of the LBT operation in the LBT subband within the BWP. Configuration of the downlink signal and/or channel when the LBT operation is successful in all the LBT subbands within the BWP may be different from configuration of the downlink signal and/or channel when the LBT operation is successful in some LBT subbands within the BWP. When the LBT operation is successful in all the LBT subbands within the BWP, a PDSCH may be configured within the BWP without a guard band between the LBT subbands.

Figure 14:
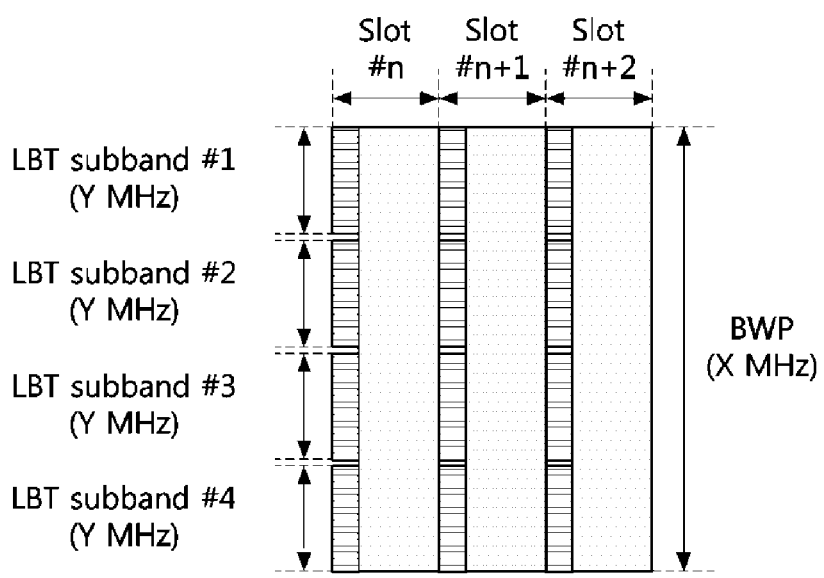
FIG. 14 is a conceptual diagram illustrating a third exemplary embodiment of a communication method using an LBT subband in a communication system.

FIG. 14 is a conceptual diagram illustrating a third exemplary embodiment of a communication method using an LBT subband in a communication system.

Referring to FIG. 14, the LBT operation may be successful in all the LBT subbands within the BWP. In this case, a PDSCH may be configured in all frequency resources belonging to the BWP. A guard band between the LBT subbands may not exist in slot(s) where the PDSCH is located. For example, the PDSCH may be mapped to a guard band between the LBT subbands. The base station may transmit DL indication information indicating that downlink communication is performed in all the LBT subbands within the BWP. The base station may transmit a downlink signal and/or channel to the terminal by using the PDSCH.

The terminal may receive the DL indication information from the base station, and may determine that downlink communication is performed in all the LBT subbands within the BWP based on the DL indication information. In this case, the terminal may assume that there is no guard band between the LBT subbands in the slot(s) where the PDSCH configured within the BWP is located. That is, the terminal may assume that the PDSCH is configured contiguously within the BWP. The terminal may determine a size of a transport block (TB) based on the above-described assumption, and may perform a rate matching operation for downlink communication.

When the LBT operation is successful in all the LBT subbands within the BWP, a guard band may not exist in all the slots(s) except the first slot or the first partial slot where the PDSCH is configure among all slots included within the COT.

Figure 15:
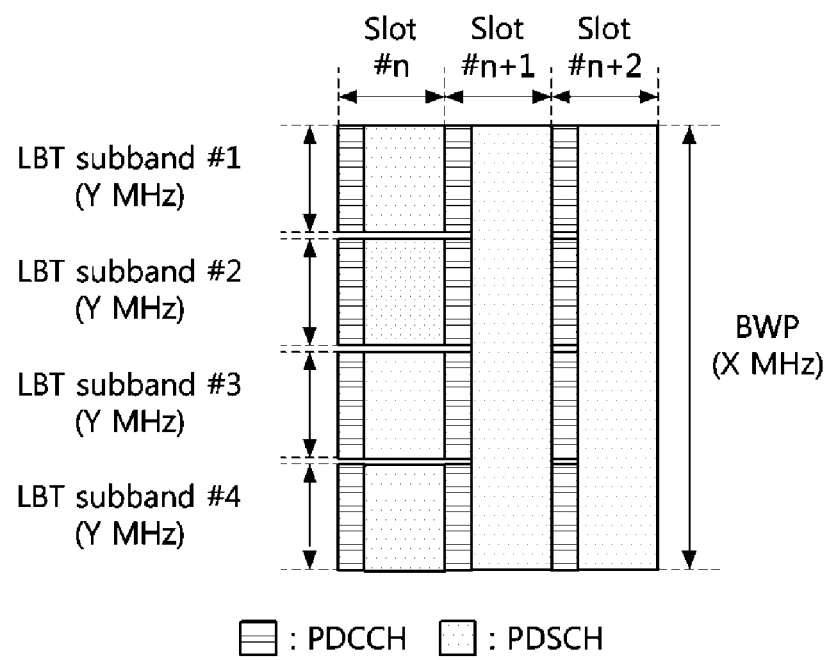
FIG. 15 is a conceptual diagram illustrating a fourth exemplary embodiment of a communication method using an LBT subband in a communication system.

FIG. 15 is a conceptual diagram illustrating a fourth exemplary embodiment of a communication method using an LBT subband in a communication system.

Referring to FIG. 15, the LBT operation may be successful in all the LBT subbands within the BWP. In this case, a PDSCH may be configured within the LBT subbands in the first slot (e.g., slot #n) of the COT. For example, the PDSCH may not be configured in guard band(s) between the LBT subbands. There may be guard(s) band between the LBT subbands in the first slot (e.g., slot #n) of the COT. Here, the first slot may be a partial slot, and the size of the partial slot may be smaller than the size of one slot.

In all the slots (e.g., slots #n+1 and #n+2) included in the COT except the first slot, the PDSCH may be configured in all frequency resources belonging to the BWP. For example, PDSCH may be configured in the guard band between the LBT subbands. The guard band between the LBT subbands may not exist in the slots (e.g., slots #n+1 and #n+2) after the first slot among the slots included in the COT.

When the LBT operation is successful in all the LBT subbands within the BWP, the base station may configure a guard band between the LBT subbands in the first slot or the first partial slot of the COT, and the guard band between the LBT subbands may not be configured in the remaining slot(s) except the first slot or the first partial slot among the slots included in the COT. Therefore, in the first slot or the first partial slot of the COT, the PDSCH may be configured in the frequency resources excluding the guard bands between the LBT subbands among all frequency resources belonging to the BWP. In the slot(s) other than the first slot or the first partial slot among the slots included in the COT, the PDSCH may be configured in all the frequency resources belonging to the BWP.

The base station may transmit DL indication information indicating that downlink communication is performed in all the LBT subbands within the BWP. The terminal may receive the DL indication information from the base station, and may determine that downlink communication is performed in all the LBT subbands within the BWP based on the DL indication information. The terminal may determine that there is guard band(s) between the LBT subbands in the first slot or the first partial slot of the COT. That is, the terminal may assume that the PDSCH is not mapped to the guard band between the LBT subbands in the first slot or the first partial slot of the COT. In addition, the terminal may determine that there is no guard band between the LBT subbands in the slot(s) other than the first slot or the first partial slot among slots included in the COT. That is, the terminal may determine that the PDSCH is mapped to all frequency resources belonging to the BWP in the remaining slot(s) except the first slot or the first partial slot among the slots included in the COT.

The terminal may determine the size of the TB in consideration of the guard band(s) between the LBT subbands in the first slot or the first partial slot of the COT, and may perform a rate matching operation for downlink communication. The terminal may determine the size of the TB without considering the guard band(s) between the LBT subbands in the slot(s) except the first slot or the first partial slot among the slots included in the COT, and may perform a rate matching operation for downlink communication.

When the LBT operation fails in one or more LBT subbands among all the LBT subbands belonging to the BWP, a guard band may be configured between the LBT subbands (e.g., LBT subbands in which the LBT operation is successful). In this case, the PDSCH may be mapped to the remaining frequency resources excluding the guard band among the frequency resources of the LBT subbands where LBT operation is successful.

In the exemplary embodiment shown in FIG. 12, the LBT operation may be successful in the LBT subbands #1 and #2, and the LBT operation may be unsuccessful in the LBT subbands #3 and #4. In this case, downlink communication may be performed in the LBT subbands #1 and #2. The PDSCH may be mapped to the remaining frequency resources excluding a guard band among frequency resources of the LBT subbands #1 and #2. That is, a guard band may exist between the LBT subbands #1 and #2, and the PDSCH may be configured in the frequency resources excluding the guard band. When the LBT operation is successful in the LBT subbands #1 and #2, the base station may configure the guard band between the LBT subbands #1 and #2, and may use frequency resources excluding the guard band between the LBT subbands #1 and #2 to transmit the PDSCH.

The base station may transmit DL indication information indicating that downlink communication is performed in the LBT subbands #1 and #2 within the BWP. The terminal may receive the DL indication information from the base station, and determine that downlink communication is performed in the LBT subbands #1 and #2 within the BWP based on the DL indication information. In this case, the terminal may determine that the guard band exists between the LBT subbands #1 and #2, and may determine that the PDSCH is configured in the frequency resources excluding the guard band between the LBT subbands #1 and #2. The terminal may determine the size of the TB and perform a rate matching operation in consideration of the guard band between the LBT subbands #1 and #2.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal in a communication system, the operation method comprising:
   receiving first configuration information of one or more guard bands of an unlicensed band from a base station;
   identifying the one or more guard bands configured in the unlicensed band based on the first configuration information;
   identifying a plurality of resource block (RB) sets configured in the unlicensed band based on the one or more guard bands;
   receiving, from the base station, second configuration information indicating whether downlink communication is performed in each of the plurality of RB sets; and
   performing the downlink communication with the base station in a first RB set among the plurality of RB sets, the first RB set being indicated by the second configuration information as an RB set in which the downlink communication is performed,
   wherein each of the one or more guard bands is located between adjacent two RB sets, resources of a channel state information-reference signal (CSI-RS) are configured in the plurality of RB sets, a measurement operation on the CSI-RS is performed in the downlink communication between the terminal and the base station in the first RB set, and the measurement operation on the CSI-RS is not performed in a second RB set among the plurality of RB sets when the second RB set is indicated by the second configuration information as an RB set in which the downlink communication is not performed.

2. The operation method according to claim 1, wherein the first configuration information includes a starting guard RB (G-RB) index and an ending G-RB index of each of the one or more guard bands, and when N guard bands are configured, a number of pairs of the starting G-RB index and the ending G-RB index, which are included in the first configuration information, is N, and N is an integer equal to or greater than 1.

3. The operation method according to claim 2, wherein a number of the plurality of RB sets configured within a bandwidth part (BWP) of the unlicensed band is N+1.

4. The operation method according to claim 1, wherein a number of RBs included in each of the plurality of RB sets is a number of RBs located between adjacent guard bands.

5. The operation method according to claim 1, wherein:
a starting RB set among the plurality of RB sets includes a starting RB of the unlicensed band to an RB just before a starting G-RB of a starting guard band among the one or more guard bands, and an ending RB set among the plurality of RB sets includes an RB after an ending G-RB of an ending guard band among the one or more guard bands to an ending RB of the unlicensed band; and
the starting RB set is an RB set having a lowest frequency resource among the plurality of RB sets, the ending RB set is an RB set having a highest frequency resource among the plurality of RB sets, the starting guard band is a guard band having a lowest frequency resource among the one or more guard bands, and the ending guard band is a guard band having a highest frequency resource among the one or more guard bands.

6. The operation method according to claim 1, wherein the second configuration information is a bitmap, and the bitmap is included in downlink control information (DCI).

7. An operation method of a base station in a communication system, the operation method comprising:
configuring one or more guard bands of an unlicensed band;
transmitting first configuration information of the one or more guard bands to a terminal;
transmitting second configuration information indicating whether downlink communication is performed in each of a plurality of RB sets to the terminal; and
performing the downlink communication with the terminal by using a first RB set among a plurality of RB sets configured in frequency resources excluding the one or more guard bands in the unlicensed band, the first RB set being indicated by the second configuration information as an RB set in which the downlink communication is performed,
wherein a number, positions, and sizes of the plurality of RB sets are determined based on the first configuration information, resources of a channel state information-reference signal (CSI-RS) are configured in the plurality of RB sets, a reporting operation of a measurement result on the CSI-RS is performed in the downlink communication between the terminal and the base station in the first RB set, and the reporting operation of a measurement result on the CSI-RS is not performed in a second RB set among the plurality of RB sets when the second RB set is indicated by the second configuration information as an RB set in which the downlink communication is not performed.

8. The operation method according to claim 7, wherein the first configuration information includes a starting guard RB (G-RB) index and an ending G-RB index of each of the one or more guard bands, and when N guard bands are configured, a number of pairs of the starting G-RB index and the ending G-RB index, which are included in the first configuration information, is N, and N is an integer equal to or greater than 1.

9. The operation method according to claim 8, wherein a number of the plurality of RB sets configured within a bandwidth part (BWP) of the unlicensed band is N+1, and a number of RBs included in each of the plurality of RB sets is a number of RBs located between adjacent guard bands.

10. The operation method according to claim 7, wherein the second configuration information is a bitmap, and the bitmap is included in downlink control information (DCI).

11. The operation method according to claim 7, further comprising transmitting, to the terminal, third configuration information of a control resource set (CORESET) configured in the unlicensed band and fourth configuration information of a search space configured in the unlicensed band, wherein the third configuration information is commonly applied to the plurality of RB sets, and a number of RBs in which the CORESET is disposed is equal to or less than a number of RBs belonging to one RB set.

12. The operation method according to claim 11, wherein the third configuration information includes an offset indicating a position of the CORESET in a frequency axis, and the offset indicates a difference between a starting RB of the unlicensed band and a starting RB of the CORESET.

13. He operation method according to claim 11, wherein the search space associated with the CORESET is repeated in the plurality of RB sets, and the fourth configuration information includes a field indicating whether the search space is configured in each of the plurality of RB sets.

14. A terminal in a communication system, the terminal comprising a processor and a memory storing at least one instruction executable by the processor, wherein the at least one instruction causes the processor to:
receive first configuration information of one or more guard bands of an unlicensed band from a base station;
identify the one or more guard bands configured in the unlicensed band based on the first configuration information;
identify a plurality of resource block (RB) sets configured in the unlicensed band based on the one or more guard bands;
receive, from the base station, second configuration information of a control resource set (CORESET) configured in the unlicensed band and third configuration information of a search space configured in the unlicensed band;
receive, from the base station, fourth configuration information indicating whether downlink communication is performed in each of the plurality of RB sets; and
performing the downlink communication with the base station in a first RB set among the plurality of RB sets, the first RB set being indicated by the fourth configuration information as an RB set in which the downlink communication is performed,
wherein the second configuration information is commonly applied to the plurality of RB sets, a number of RBs in which the CORESET is disposed is equal to or less than a number of RBs belonging to one RB set, resources of a channel state information-reference signal (CSI-RS) are configured in the plurality of RB sets, a measurement operation on the CSI-RS is performed in the downlink communication between the terminal and the base station in the first RB set, and the measurement operation on the CSI-RS is not performed in a second RB set among the plurality of RB sets when the second RB set is indicated by the fourth configuration information as an RB set in which the downlink communication is not performed.

15. The terminal according to claim 14, wherein the first configuration information includes a starting guard RB (G-RB) index and an ending G-RB index of each of the one or more guard bands; when N guard bands are configured, a number of pairs of the starting G-RB index and the ending G-RB index, which are included in the first configuration information, is N; a number of the plurality of RB sets configured within a bandwidth part (BWP) of the unlicensed band is N+1; and N is an integer equal to or greater than 1.

16. The terminal according to claim 14, wherein the second configuration information includes an offset indicating a position of the CORESET in a frequency axis, and the offset indicates a difference between a starting RB of the unlicensed band and a starting RB of the CORESET.

17. The terminal according to claim 14, wherein the search space associated with the CORESET is repeated in the plurality of RB sets, and the third configuration information includes a field indicating whether the search space is configured in each of the plurality of RB sets.

* * * * *